(12) United States Patent
Tomoyori et al.

(10) Patent No.: US 6,208,404 B1
(45) Date of Patent: Mar. 27, 2001

(54) BLACK MATRIX

(75) Inventors: Makoto Tomoyori, Iwate-ken; Akira Fujishima, Kawasaki; Kazuhito Hashimoto, Yokohama, all of (JP)

(73) Assignee: Tryonics Corporation, Iwate-Ken (JP)

( * ) Notice: Subject to any disclaimer, the term of this patent is extended or adjusted under 35 U.S.C. 154(b) by 0 days.

(21) Appl. No.: 08/854,897

(22) Filed: May 13, 1997

(30) Foreign Application Priority Data

May 16, 1996 (JP) ........................................... 8-121559
Apr. 21, 1997 (JP) ........................................... 9-103404

(51) Int. Cl.$^7$ .................................................. G02F 1/1333
(52) U.S. Cl. ........................... 349/187; 349/106; 349/111; 349/158
(58) Field of Search ..................................... 349/106, 110, 349/111, 149, 150, 152, 158; 204/485, 486; 205/316, 317; 427/407.2, 437, 438, 443.1; 430/7, 20, 321

(56) References Cited

U.S. PATENT DOCUMENTS 5,495,354 * 2/1996 Jo ........................................... 349/110
6,061,109 * 5/2000 Suginoya et al. ..................... 349/111

* cited by examiner

Primary Examiner—William L. Sikes
Assistant Examiner—Tai V. Duong
(74) Attorney, Agent, or Firm—Donald E. Schreiber

(57) ABSTRACT

There is provided a method of manufacturing a color display including a color filter and a black matrix, characterized in that it comprises the steps of: forming a film of zinc oxide on a transparent substrate; forming the the color filter on the said film of zinc oxide; and thereafter, applying a deposit of electroless copper plating on an area of the said film of zinc oxide on which the said color filter is not formed, the said deposit having a thickness which is substantially equal to a thickness of the said color filter and constituting an element of said black matrix. Thus, a color display may be provided with a black matrix that is of high optical density and a low reflectivity. The black matrix can also be commensurate with film thickness with the color matrix. No photo lithographic process is required in preparing the color filter and black matrix. Various modified forms of embodiments of the method of manufacturing a color display are also disclosed.

18 Claims, 15 Drawing Sheets

( Prior Art )

Fig. 13
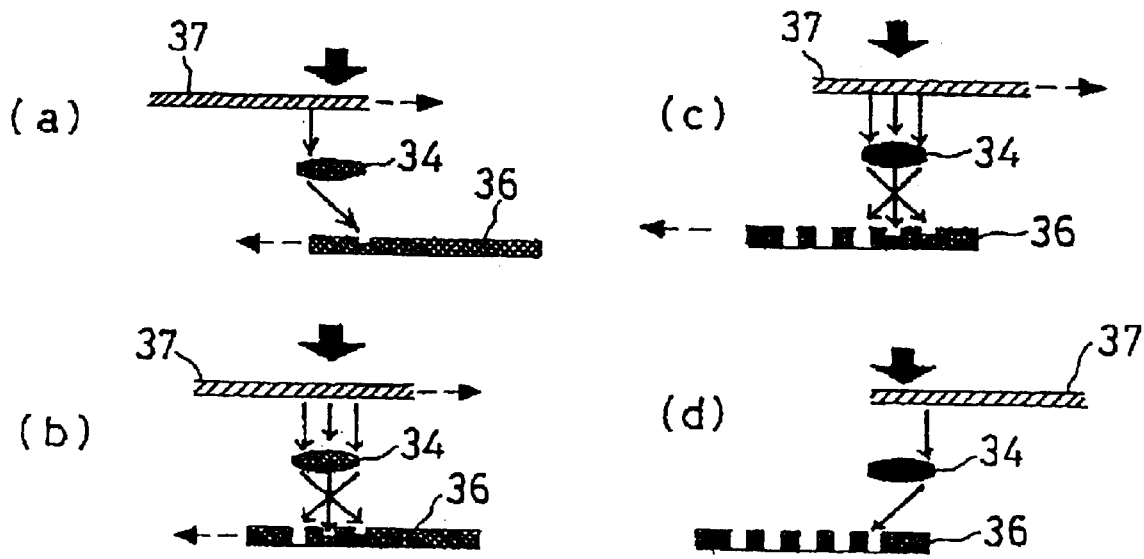
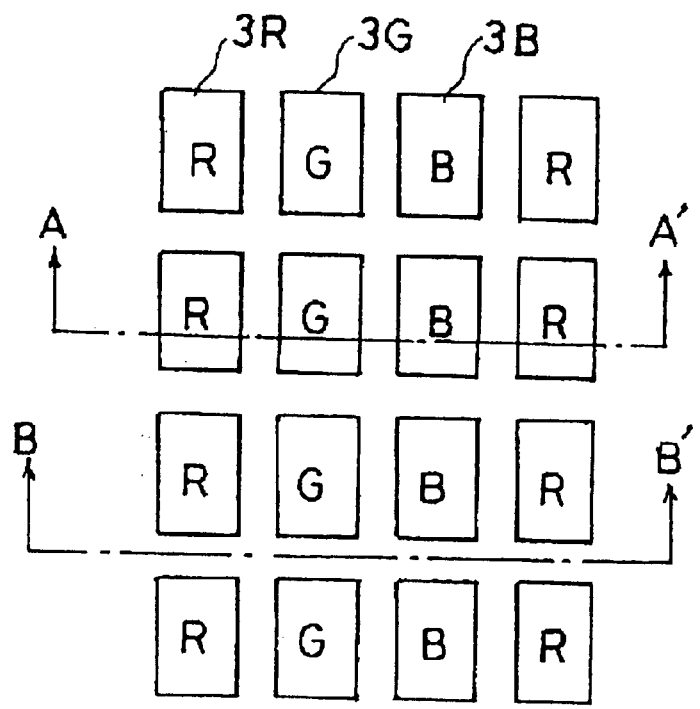
Fig. 14

(a)

(b)

(c)

BLACK MATRIX

TECHNICAL FIELD

The present invention relates to a black matrix as well as a color filter for use in a color (flat) display such as a liquid crystal display, a thin film EL display or a field emitter display device to obtain a clear color display. More particularly, the invention relates to a method of manufacturing a color (flat) display, whereby the black matrix and the color filter may be prepared with an enhanced aperture rate and they as well as a cell gap controlling spacer arrangement can be prepared without a photo lithographic process that has hitherto had to be used despite of its complicated handling procedures.

BACKGROUND ART

An explanation will first be given of a typical color liquid crystal display device with reference to FIG. 1 of the drawings attached hereto.

In FIG. 1, there is shown a pair of glass substrates 1A and 1B which are spaced apart from each other. Of them, the one glass plate 1A has, outside thereof, a polarization plate 2A bonded thereto and has, inside thereof, a number of color filter elements 3G, 3R and 3B arranged for the three primary colors: red (R), green (G) and blue (B) of a light. Further, between a pair of adjacent color filter elements 3 and 3, there is disposed a black matrix element or black stripe 4 that is designed to effect a glare protection and thus to obtain a clear color display. Of them, the black stripe is used exclusively for an electroplated color filter. Hence, numeral 4 here is used hereinafter in connection with the present invention to refer to a black matrix or black matrix element. Also, inside of the color filter 3 and the black matrix 4 mentioned above, there is disposed via a protective filter 5 a transparent electrode 6A.

On the other hand, outside of the other 1B of the above mentioned glass substrates, there is disposed via a polarization plate 2B a light illuminating plate 7 that functions to provide a back light. In the vicinity of an end surface of the said light illuminating plate 7, there is disposed a fluorescent lamp 8 that is adapted to cause the said light illuminating plate 7 to emit a light from over a surface thereof. Also, inside of the above mentioned glass substrate 1B, there are so arranged a plurality of gates 10 as are covered with an insulating layer 9. Further, inside of the said insulating layer 9, there are arranged hydrogenated amorphous thin film transistors 11, which are switching elements in opposition to the above mentioned gates 10, in a manner such that they may be surrounded with their respective protective members 12. And, inside of the above mentioned insulating layer 9, there are arranged transparent electrodes 6B, each associated with a said hydrogenated amorphous thin film transistor 11 for supplying the same with an electric current, respectively. It should also be noted that a liquid crystal LC is sealed in a tightly closed space between the above mentioned transparent electrodes 6A and 6B.

An explanation will now be given with respect the functions of the above mentioned black matrix 4 in a liquid crystal color display device as mentioned above. If the said black matrix 4 is held in the state in which the green color filter element 3G is turned ON and the red color filter element 3R and the blue color filter element 3B which are adjacent thereto are each turned OFF, it will function in a manner such that the back light which is surface emitted from the said light illuminating plate 7 may be transmitted only through the said green color filter 3G that is in the ON state and may not reach the said red and blue color filters 3R and 3B which are each in the OFF state.

And, the said black light matrix 4 is required to be composed of a material that is not only capable of shielding the back light but is of a low reflectivity to the back light. This is because if the green color filter element 3G is in the ON state and the red and blue color filter elements 3R and 3B which are adjacent thereto are each in the OFF state, when the black matrix 4 has a high reflectivity to the back light a said back light that is reflected at the black matrix 4 will be incident to those hydrogenated amorphous thin film transistors 11 which are each in the OFF state, corresponding to the red and blue color filter elements 3R and 3B, and may possibly turn those transistors 11 each into the ON state.

By the way, from the standpoint of the requirement for a lower reflectivity, a resinous black may be used as a composition for a black matrix 4 to provide a reflectivity that is as low as 0.5%, and is thus found to be much superior to a metallic chromium composition having a reflectivity of 50% and to a low reflection chromium composition having a reflectivity of 30% or less. A black matrix 4 that is composed of the resinous black has the problem, however, that its optical density (OD) which is an index that is indicative of a light shielding performance for the back light is 2.3 which is lower than 4 or more with the metallic chromium composition or the low reflection chromium. For this reason, a low reflection composition in which a chromium oxide component is mounted on a metallic chromium component is now becoming a leading composition for a black matrix 4.

An explanation will next be given with respect to a method of preparing a black matrix 4. In a method other than an electroplating method, a black matrix 4 is first formed on a glass substrate 1 and thereafter each of the color filter elements 3R, 3G and 3B are formed. While four methods of forming a color filter 3 have been employed up to present, a brief explanation will here be given of a pigment dispersion method and an electroplating method in the interest of convenience.

First, an explanation will be given of the pigment dispersion method.

Referring to FIG. 2, a glass substrate 1 on which a black matrix 4 is formed as shown at (a), is coated over its entire surface with a coloring resist 13 for a said red color filter element 3R, as shown at (b), by the spin coating method or the roll coating method. Then, as shown at (c), the above mentioned coloring resist 13 is coated with a photo resist 14 by the spin coating method or the roll coating method. Further, as shown at (d) and (e), the layers 13 and 14 through a photo mask 15 are exposed to a light and developed to form red color filter elements 3R.

Thereafter, by repeating a procedure as mentioned above with respect to a said green color filter element 3G and a said blue color filter element 3B, eventually the three color filter elements 3R, 3G and 3B are formed.

Next, an explanation will be given of the electroplating method.

Referring to FIG. 3, a glass substrate 1 has an ITO (indium tin oxide) thin film 16 for electroplating formed thereon by the evaporation method, whereafter the said ITO thin film 16 is coated with a photo resist 14, as shown at (a). Then, as shown at (b), (c) and (d), the layers 14 and 16 are exposed through a photo mask 15 to a light and developed, and etched to form a stripe of the said ITO thin film 16. Thereafter, as shown at (e), the glass plate 1 on which the said stripe of the ITO thin film 16 is formed is immersed in an electroplating or electro-depositing liquid in which particles of a pigment for a said red color filter element 3R are dispersed, and a positive voltage is applied between a pair of electrodes which are opposed to each other across the said ITO thin film 16 stripe so that those particles of the red pigment which have a particle size in the order of submicrons and are charged negative may electrolytically migrate towards the said ITO thin film 16 stripe charged positive and may then be electrolytically deposited on its surfaces. Subsequently, a said green color filter element 3G and a said blue color filter element 3B are electrolytically deposited by using respective electrolytic depositing or plating (i.e. electro-depositing or electroplating) liquids therefor.

In this manner, a color filter in a matrix 17 that comprises red, green and blue color filter elements 3R, 3G and 3B is formed on the said glass substrate 1 as shown at (f), referring continuingly to FIG. 3. Then, as shown at (g), a resinous black 18 having a photosensitivity is coated on the said color matrix 17 by the spin coating method or the roll coating method. Thereafter, if the said glass substrate 1 is exposed to a back light in the form of ultraviolet (UV) rays as shown at (h), the photosensitive resinous black 18 on the said colour matrix 17 will not be exposed to the said light in the presence of the intervening color filter elements 3R, 3G and 3B. And, it will be removed in the development process. As a consequence, a black matrix 4 will be formed in which the said resinous black 18 remains only between the adjacent ones of the said color filter elements 3R, 3G and 3B as shown at (i).

By the way, unlike a semiconductor IC a color filter 3 arrangement has an extremely large external size and requires a dimensional accuracy represented by a pixel pitch of 75 $\mu$m and a gap of 25 $\mu$m in the VGA (Video Graphic Array) specification, and a pixel of 70 $\mu$m and a gap of 20 $\mu$m in the SVGA (Super Video Graphic Array) specification and requires a positional accuracy per a panel of ±2 $\mu$m. Hence, it has adopted its manufacturing process which relies much on a photo step, if the process were not the printing method.

And, it has been recognized that the printing method will be unable to meet with the requirement in the future that the mother glass should be much more large sized and the pixel should be made increasingly finer.

In forming a color filter arrangement according to a conventional method, there has also been a fear that due to the presence of a difference in level between a color filter 3 and a black matrix 4 arising from a difference between the film thicknesses, a problem of step coverage may be created at a location where there is such a difference in level. This has hitherto required the said difference in level to be filled up by coating a transparent resin over the entire surface and, if needed, the coated surface to be further processed by polishing, thus rendering the process much complicated.

The present invention has been provided in view of the foregoing problems taken into account, and has for its object to provide a method of manufacturing a color display, whereby a color filter and a black matrix therein can be manufactured while not using at all a photo-lithographic step that is complicated and yet that requires a high degree of cleanness or using the latter step at the minimum, the black matrix can be manufactured having a high optical density and a low reflectivity as well as an enhanced aperture rate, and an arrangement of columnar cell gap controlling spacers therein which are precisely positionable can be obtained.

SUMMARY OF THE INVENTION

In order to achieve the object mentioned above, there is provided in accordance with the present invention, in a first aspect thereof, a method of manufacturing a color display including a color filter and a black matrix, characterized in that the said black matrix is prepared by the steps of: forming a film of zinc oxide on a transparent substrate; and applying a deposit of electroless copper plating onto the said film of zinc oxide while utilizing an catalytic action by palladium chloride, the said deposit constituting an element of the said black matrix.

By adopting the construction mentioned above, it should be noted that a color display may be provided with a black matrix that can be obtained which is of a high optical density and a low reflectivity.

The invention also provides, in a second aspect thereof, a method of manufacturing a color display including a color filter and a black matrix, characterized in that it comprises the steps of: forming a film of zinc oxide on a transparent substrate; forming the said color filter on the said film of zinc oxide; and thereafter, applying a deposit of electroless copper plating on an area of the said film of zinc oxide on which the said color filter is not formed, the said deposit having a thickness which is substantially equal to a thickness of the said color filter and constituting an element of said black matrix.

By adopting the configuration set forth above, it should be noted that a color display may be provided simply with a black matrix that is commensurate in film thickness with the said color filter.

According to a certain feature of the present invention, that is concomitant with the above mentioned aspects thereof, a thin film of copper oxide is formed on a surface of the said deposit of electroless plating.

By adopting the construction mentioned above, it should be noted that a color display may be provided with a black matrix that can be obtained which is stable and of a low reflectivity as viewed from the side of the color filter.

According to another feature of the present invention, that is concomitant with the above mentioned aspects thereof, the said film of zinc oxide is doped with aluminum and is then used to serve as a transparent electroplating electrode as well.

By adopting the construction mentioned above, it should be noted that there will be no need to provide the said ITO transparent electrode separately.

According to another feature of the present invention, that is concomitant with the above mentioned aspects thereof, the said transparent substrate is a glass substrate, which may be made up of a soda glass.

It should be noted that these arrangements are enabled because the said zinc oxide is effective to prevent an alkaline dissolution.

According to another feature of the present invention, that is concomitant with the above mentioned aspects thereof, the said transparent substrate is made up of an organic film, which may be a polyester film.

By adopting such a construction as set forth above, it should be noted that an further inexpensive black matrix and hence such a color display can be provided.

According to another feature of the present invention, that is concomitant with the above mentioned aspects thereof, a driver integrated circuit is connected through a solder bump to the said electrolessly plated copper deposit.

By adopting such a construction as set forth above, it should be noted that in a color display such as an STN (Super Twisted Nematic) liquid crystal display, there will be no need to provide an expensive bump such as a metallic bump, and a direct bonding to the said IC glass substrate will be made possible.

The invention also provides a third aspect thereof, a method of manufacturing a color display including a color filter and a black matrix, characterized in that said color filter is prepared by the steps of: forming a first film that is of a first color filter element of a first color which is selected from three primary colors: red R, blue B and green G over a surface of a glass substrate, and dividing, by means of eximer laser machining, the said first film into a plurality of color filter regions of the said first color; forming a second film that is of a second color filter element of a second color which has not been selected from the said three colors: R, B and G over such a surface of the said glass substrate as is exposed among the said first color filter regions of the said first color as a result of division of the said first film, and dividing, by means of eximer laser machining, the said second film into a plurality of color filter regions of the said second color; and forming a third film that is of a third color filter element of a third color which has not been selected from the said three colors and which is other than the said first and second colors, over such a surface of the said glass substrate as is exposed among the said first and second color filter regions divided from the said first and second films, and dividing, by means of eximer laser, the said third film into a plurality of color filter regions of the said third color, thereby forming over the surface of the said substrate a color filter which consists of a plurality of red R color filter elements, a plurality of blue B color filter elements and a plurality of green G color filter elements.

By adopting the construction mentioned in the preceding paragraph, it should be noted that without using at all a photo-process that has been complicated a color filter can be prepared in a triangular or a mosaic pattern which it has hitherto been impossible to form based on an electroplating process.

The invention also provides, in a fourth aspect thereof, a method of manufacturing a color display including a color filter and a black matrix, characterized in that said color filter is prepared by the steps of: a) coating a surface of a glass substrate with a transparent electrode; b) forming a transparent film of a ferroelectric substance on the said transparent electrode; c) partially polarizing and charging the said transparent film of the ferroelectric substance in color filter forming regions thereof of a particular color; d) depositing on the said polarized and charged transparent film of the ferroelectric substance a color filter pigment of the said particular color that is reversely polarized and charged; and e) repetitively performing the steps c) and d) for the said color filter forming regions with respect to a red R, a blue B and a green G color as the said particular color.

By adopting the construction mentioned above, it should be noted that a color display may be provided with a color filter that can be prepared without using a photoresist step at all.

According to a further aspect of the present invention, the method set forth in the preceding paragraph may further comprises: providing a black matrix forming region in the said transparent film of the ferroelectric substance that is formed on the said transparent electrode; forming a polarization and charging preventive film on the said black matrix forming region; forming an electrolessly plated copper film on the said polarization and charging preventive film; and oxidizing at least partially the said electrolessly plated copper film.

By adopting the construction mentioned in the preceding paragraph, it should be noted that a color display may be provided with a black matrix that can be distinctly formed by preventing a color filter from being formed in a black matrix forming region.

The invention also provides, in a still further aspect thereof, a method of manufacturing a color display including a color filter and a black matrix, characterized in that the said black matrix is prepared by the steps of: coating a surface of a glass substrate with a transparent electrode; forming a color filter on the said transparent electrode; forming on a surface portion of the said transparent electrode which has not been formed thereon with the said color filter and which is thus exposed a film of zinc oxide with the said transparent electrode serving as an electrically conducting terminal; forming an electrolessly plated copper film on the said film of zinc oxide; and oxidizing at least partially the said electrolessly plated copper film.

By adopting the construction mentioned in the preceding paragraph, it should be noted that a color display may be provided with a black matrix having a high aperture rate that can be formed simply and without using a photo step at all.

The invention also provides, in yet a further aspect thereof, a method of manufacturing a color display including a color filter, a black matrix and a cell gap controlling spacer arrangement, characterized in that the said spacer assembly is prepared by the steps of: forming a glass substrate with a color filter having an uppermost layer constituted of a transparent electrode; forming a photo resist pattern on the said transparent electrode while using a mask for forming a spacer; forming a plurality of columnar spacers each composed of transparent zinc oxide by using a solution electrolysis process; and coating a surface of each of the said spacers with an insulating film of zinc oxide.

By adopting the construction mentioned in the preceding paragraph, it should be noted that a color display may be provided with an arrangement of spacers which are accurately positioned with a photo step that can be obtained without using a spacer spreading unit.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings:

FIGS. 13(a)–(d) are a series of step views that shows an eximer laser machining operation with an apparatus shown in FIG. 12;

FIG. 14 is a top plan view that shows a certain form of embodiment of the color filter as prepared by an electroplating method;

BEST MODES FOR CARRYING OUT THE INVENTION

Hereinafter, suitable embodiments of the present invention with respect to a color (flat) display will be set forth with reference to the accompanying drawings hereof.

A detailed explanation will now be given of a certain embodiment of the present invention with references to the drawings hereof.

Figure 1:
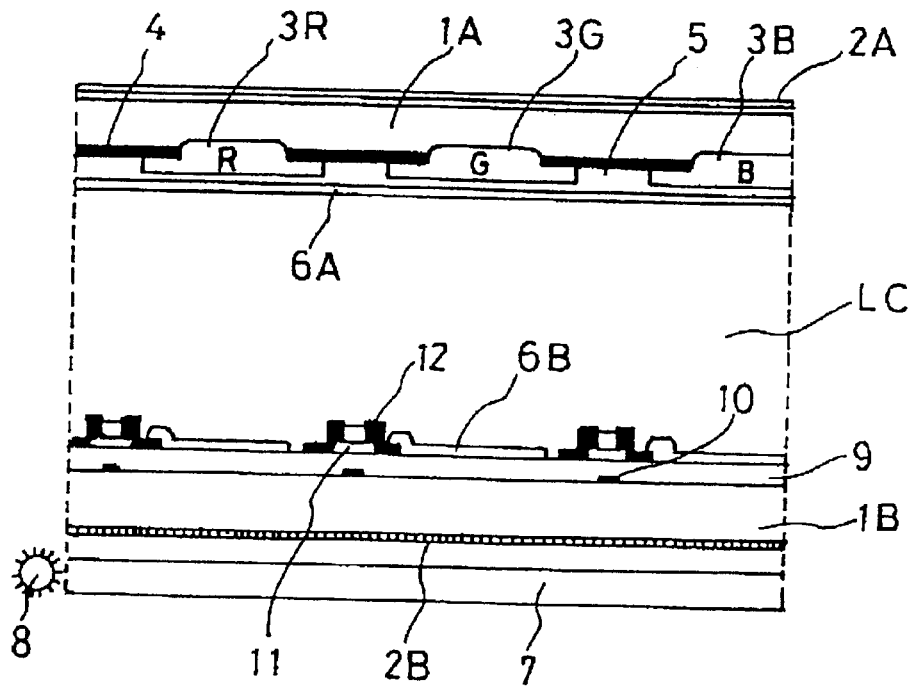
FIG. 1 is a longitudinal cross sectional view that shows a typical color liquid crystal display device.
Figure 2:
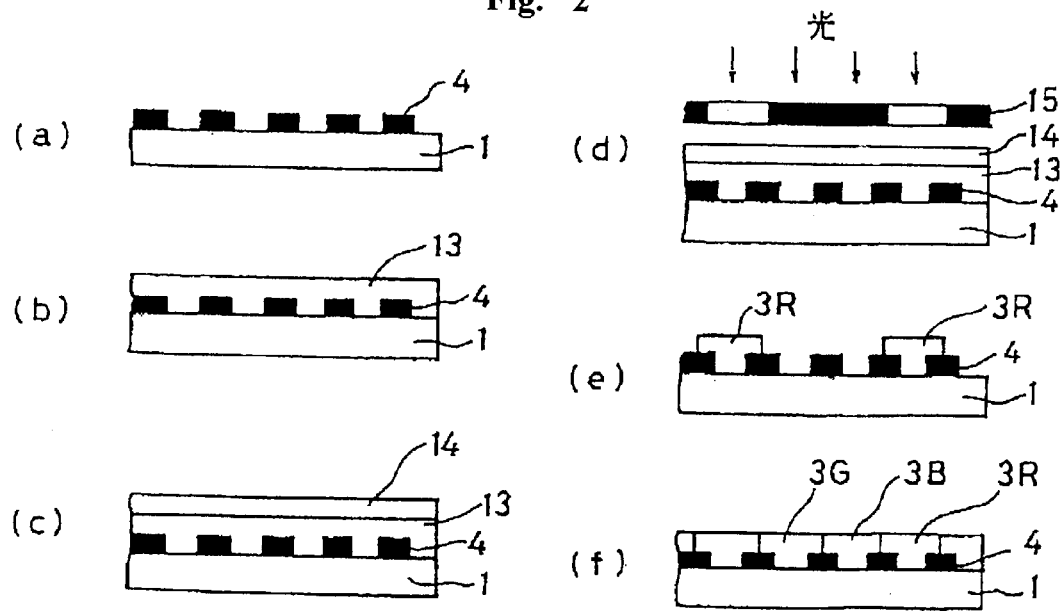
FIGS. 2(a)–(f) are a series of step views that shows a method of preparing a black matrix according to a pigment dispersion method in the prior art.
Figure 3:
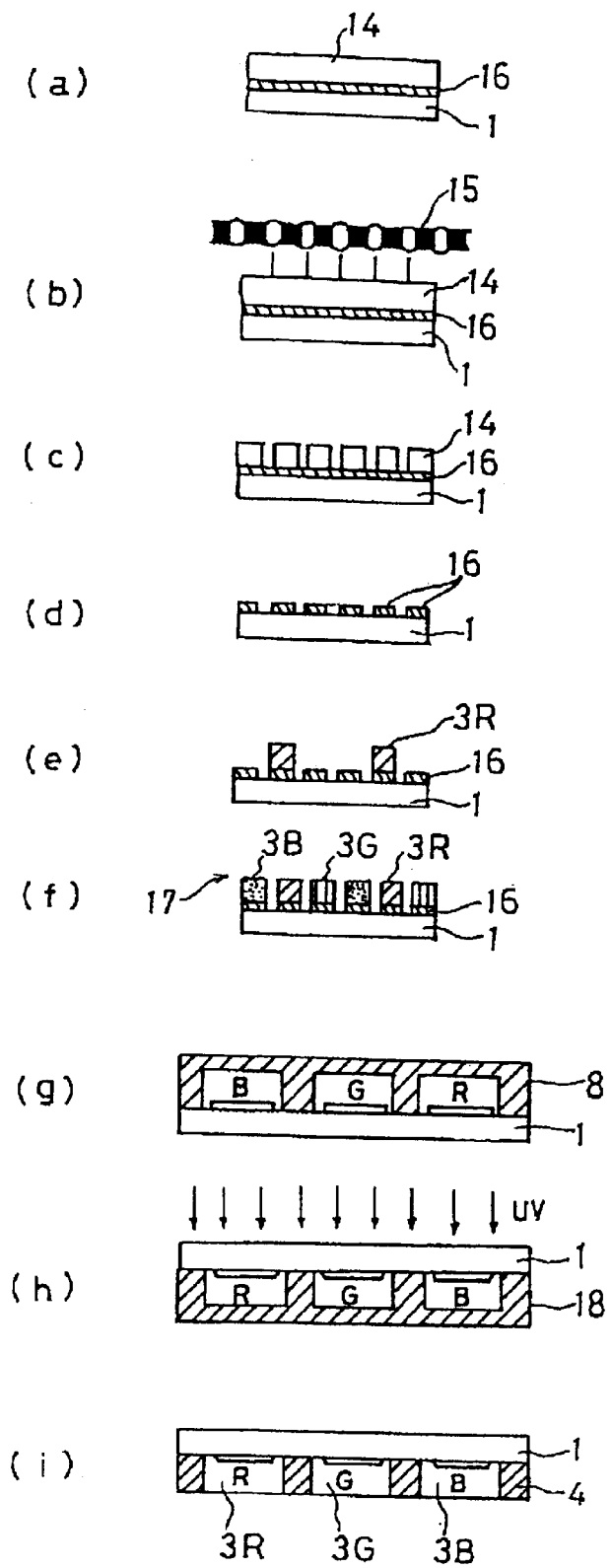
FIGS. 3(a)–(i) are a series of step views that shows a method of preparing a black matrix according to an electroplating method in the prior art.
Figure 4:
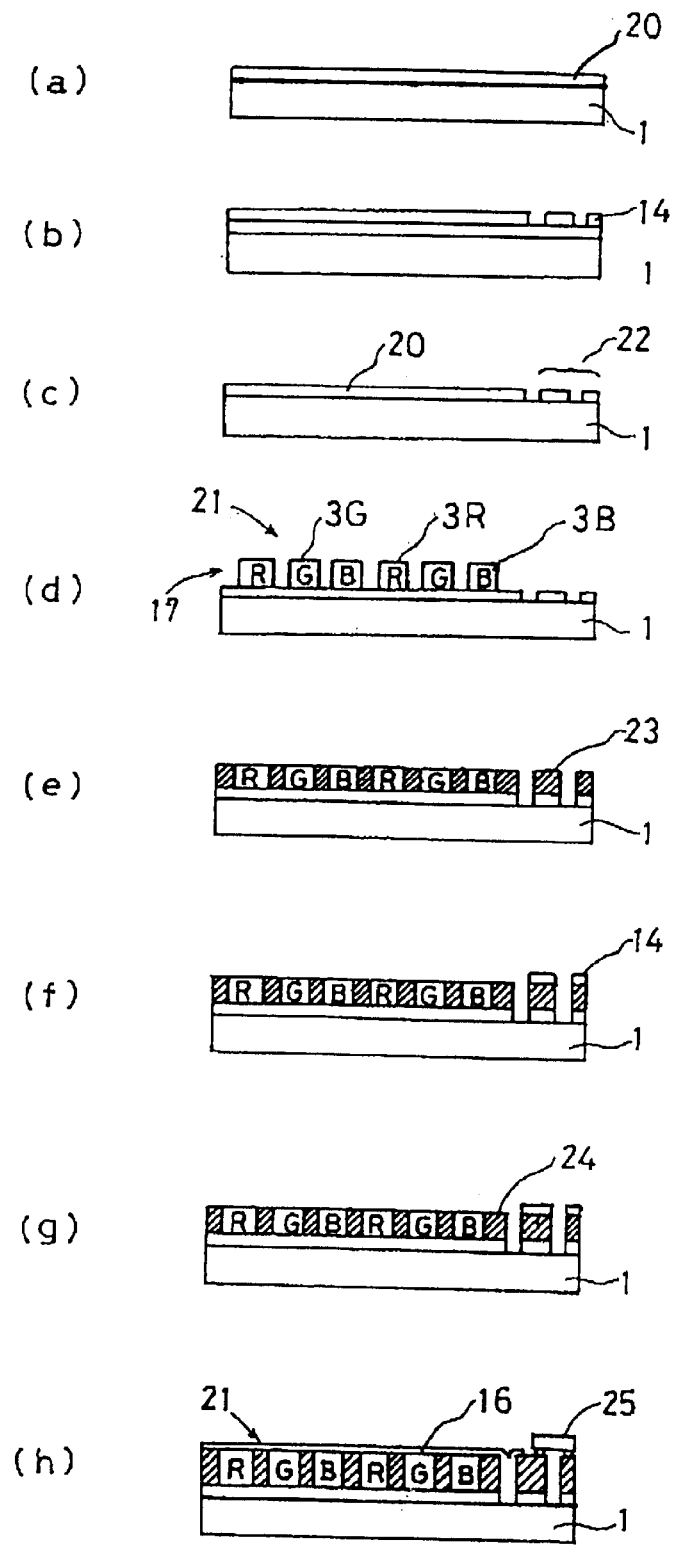
FIGS. 4(a)–(h) are an explanatory view that shows a first form of embodiment of the present invention, successively with a series of steps (a) to (h)

FIG. 4 shows the form of a first embodiment of the method of preparing a black matrix in which a color filter is formed by a dyeing method, a pigment dispersion method, a printing method or the like.

First of all, the glass substrate 1 will be formed with a film 20 of zinc oxide (ZnO) by sputtering or the like as shown at (a) in FIG. 4. The zinc oxide film 20 is a transparent oxide film which if it is a zinc oxide film having a thickness of 2000 to 3000 angstroms, has a transmissivity not less than 85% in the visible light range of the said substrate glass. Then, using a photo resist 14 as shown at (b), the said zinc oxide film 20 will be formed by a photo process with a pixel section 21 and a driver circuit section 22 patterned as shown at (c).

Then, as shown at (d) in FIG. 4, the above mentioned pixel section 21 that has been formed by the photo process will be formed, by the dyeing method, the pigment dispersion method, the printing method or the like, on the above mentioned zinc oxide film 20 with a color matrix 17 that comprises red, green and blue color filter elements. The color matrix 17 will have a film thickness which is considered to be of 1 to 2 $\mu$m.

Subsequently, the said glass substrate 1 formed with the said color matrix 17 will be immersed in a solution of palladium chloride ($PdCl_2$) having a catalytic action for a period of 1 to 2 minutes to adsorb Pd ions on its exposed outer surfaces. The resulting glass substrate 1 will be immersed in an electroless copper plating solution to allow a copper component 23 to be electrolessly deposited thereon with a thickness corresponding to the film thickness of the said color matrix 17 as shown at (e) in FIG. 4. It should be noted here that the above mentioned palladium chloride solution may, as an example, have a composition of 0.2 g of $PdCl_2$, 0.5 ml of HCl and 500 ml of $H_2O$.

And, in an electroless depositing process as mentioned above, the said copper component 23 will be selectively deposited only on a portion at which the said zinc oxide film 20 is exposed and may not be deposited on a portion on which the said color matrix 17 has been formed. This indicates that the said color matrix 17 plays a role as a mask. As a consequence, a black matrix 4 can be formed automatically, without requiring any photo process at all.

The said copper component 23 that has been deposited at the above mentioned pixel section 21 will, as seen from the side of the said glass substrate 1 located backwards, be viewed in a black color because of the appearance of a surface plasmon polariton (SPP) which is to be described later, but will, as seen from the side at which the said color matrix 17 has been formed, be viewed in a color of copper itself having a metallic brightness. Thus, in this state, it has a high reflectivity to a back light and is poor in its utility. Therefore, as shown at (f) in FIG. 4, the said driver circuit section 22 should be masked with photo resists 14 and the said glass substrate 1 as a whole will be immersed in a solution that is capable of oxidizing the copper component, e.g., in a peroxide, nitric acid or like solution, so as to convert the surface of the copper deposition component 23 to a thin film 24 of copper oxide (CuO) that has a low reflectivity as shown at (g). It should be noted at this point that instead of such a wet type oxidation, a heating in an oxygen plasma may be employed to convert the surface of the copper deposition component 23 to a said copper oxide thin film 24.

Subsequently, as shown at (h) in FIG. 4, the said photo resist 14 that has masked the said driver circuit section 22 will be removed, whereupon the said pixel section 21 will be formed with a said ITO thin film 16 for display and will thus be electrically connected to the said driver circuit section 22 having the said copper component 23 deposited on the said zinc oxide film 20. Finally, a driver IC 25 will be applied to the said driver circuit section 22 at an exposed copper component 23.

According to the above mentioned first embodiment of the present invention, a black matrix 4 can be prepared simply and inexpensively without requiring a photo process.

It may be noted at this point that in a metal and a semiconductor that is high in free electron concentration there is a plasmon that is constituted by a compressional wave of free electrons. Since the plasmon is represented by a collective vibration of free electrons, it may of necessity be classified into a polariton that involves the vibration of an electromagnetic field (and that results from a combination of the vibration of particles and the vibration of an electromagnetic field). And, it is known that since a metal or a semiconductor has on its surface a vibrational mode called "plasma polariton", it may be able to absorb lights whose phase velocities become identical to one another. In general, lights having different phase velocities are not absorbed by a metal having a smooth surface. However, if a metal has a surface irregularity, a change will occur in the phase velocity of an incident light so that lights may be absorbed thereby. When the interface between the copper deposition component 23 and the zinc oxide film 20 in the above mentioned black matrix 4 was observed by an electron microscope, it was confirmed that a minute irregularity in the order of submicrons had been formed. Accordingly, it can be concluded that the black matrix 4 that is prepared according to the present form of embodiment of the invention will enable the surface plasmon polariton to be excited at the said surface irregularity with lights in the visible range and, as a result, will exhibit a tremendous visible light absorptivity, as represented at the interface between the copper deposition component 23 and the zinc oxide film 20 by its optical density (OD) being 5, thus putting an enhanced aperture rate into reality.

Further, the above mentioned problem in the prior art with respect to a difference in level between a color matrix 17 and a black matrix 4 will also be resolved by the present form of embodiment of the invention in which an electroless plating operation is carried out to fill up spaces the width of which corresponds to the film thickness of the color matrix 17. Thus, a flat black matrix 4 can be obtained with no difference in level between the same and the color matrix 17.

It may also be noted that in general an active matrix liquid crystal display makes use of a glass substrate 1 that is constituted of a non-alkaline glass substrate or a silica glass substrate and that an STN (Super Twisted Nematic) liquid crystal display makes use of a glass substrate which is coated with $SiO_2$. With a black matrix prepared according to this form of embodiment of the present invention, the zinc oxide film 20 acts to prevent the alkaline from being dissolved and hence can omit the step of coating the soda glass with $SiO_2$, thus permitting a further cost-down to be achieved.

It should also be noted that in an STN liquid crystal display, in general a driver IC is mounted on both one glass substrate 1 at the side of a color filter and the other glass substrate. In the prior art, because of the inability to solder onto an ITO thin film 16, it has been the common practice to use an ACF (Anisotropic Conductive Film) to which is connected the driver IC having a bump that consists of gold. According to the present form of embodiment of the invention, however, it will be seen that since a black matrix 4 is formed from a copper deposition component 23, a driver IC having a soldered bump can easily be mounted.

Figure 5:
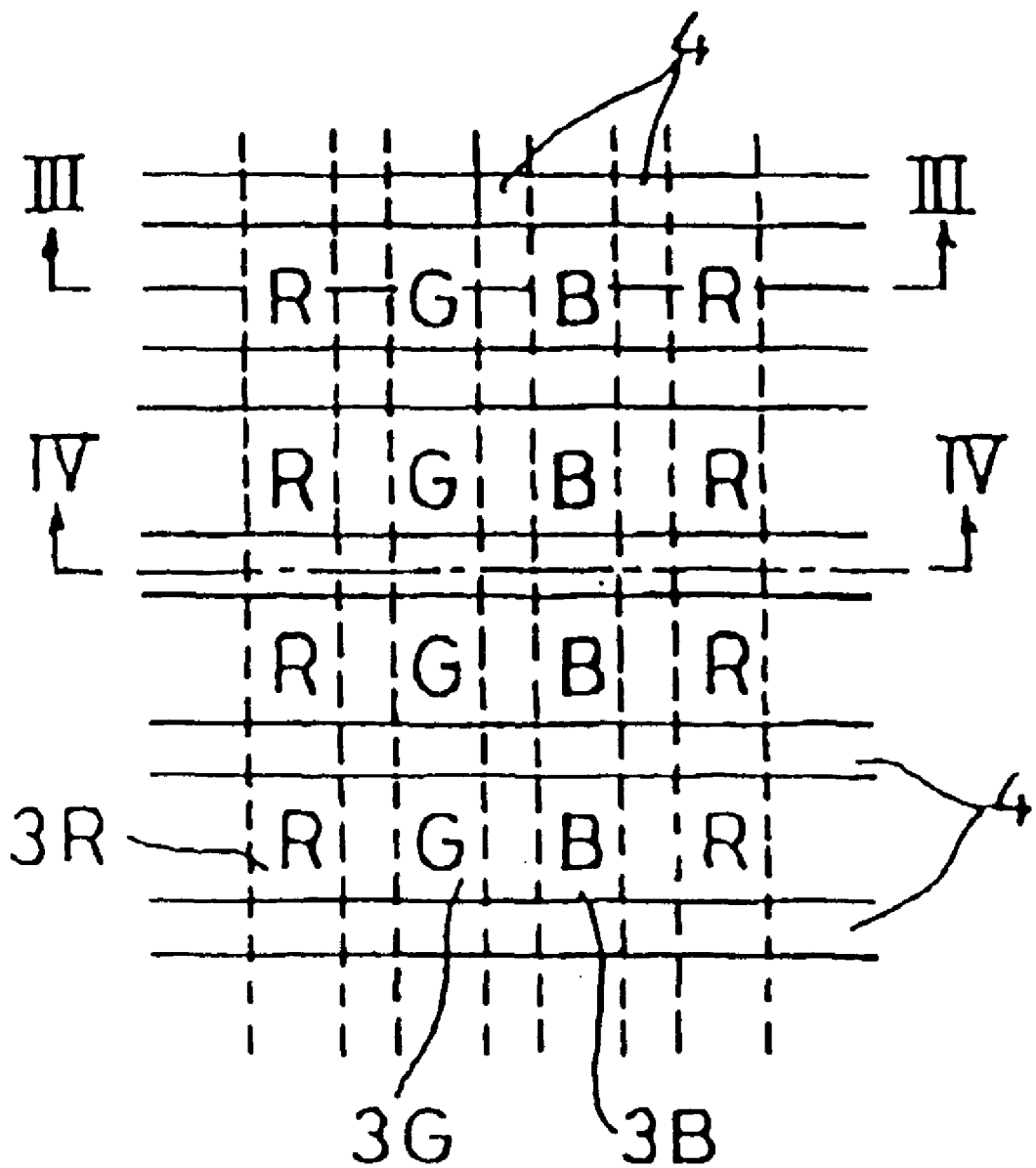
FIG. 5 is a top plan view that shows a configuration of a black matrix in a second form of embodiment of the present invention.
Figure 6:
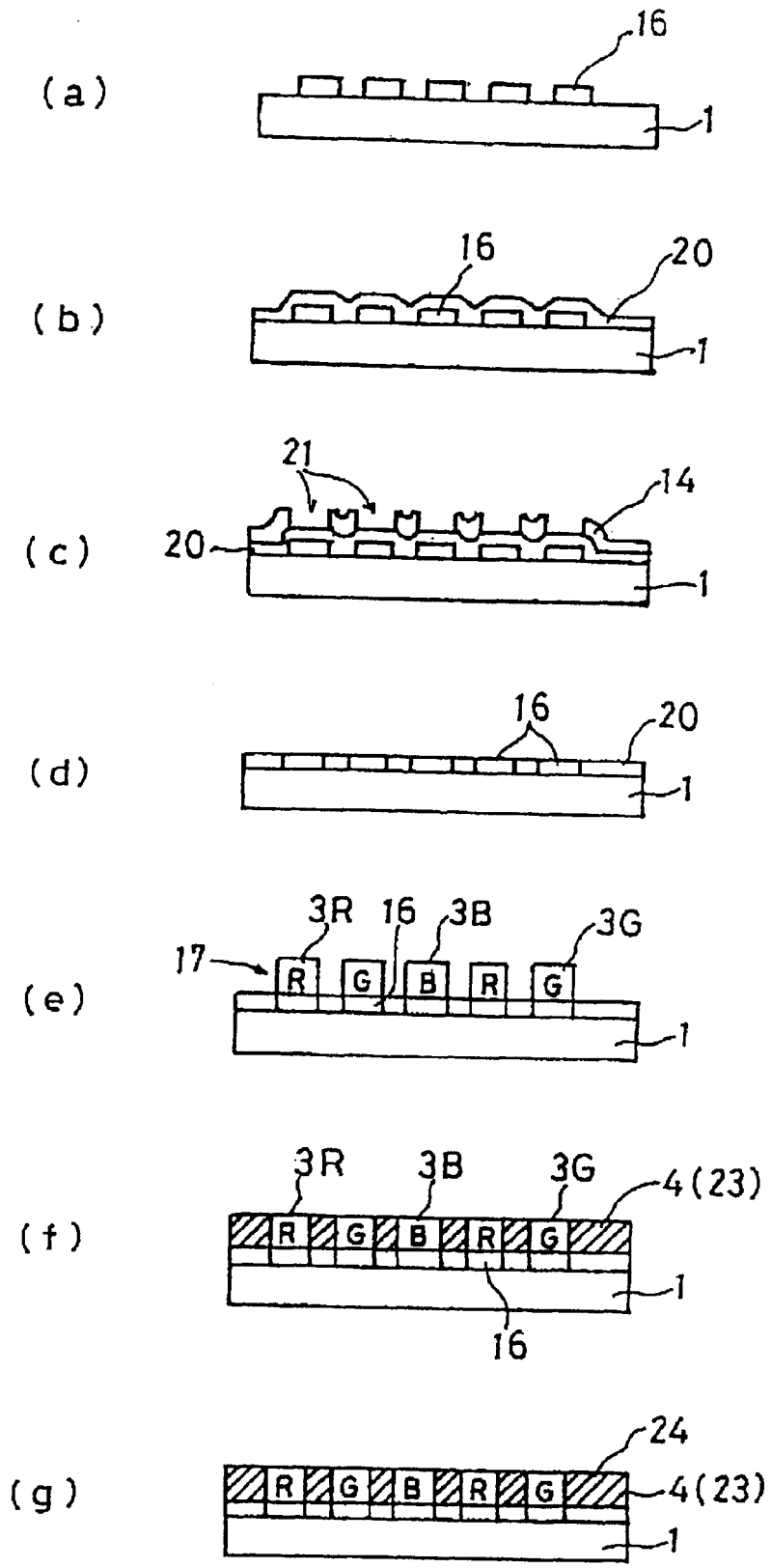
FIGS. 6(a)–(g) are an explanatory view that shows the first form of embodiment of the present invention successively in a series of steps (a) to (g), taken along the line III—III in FIG. 2.
Figure 7:
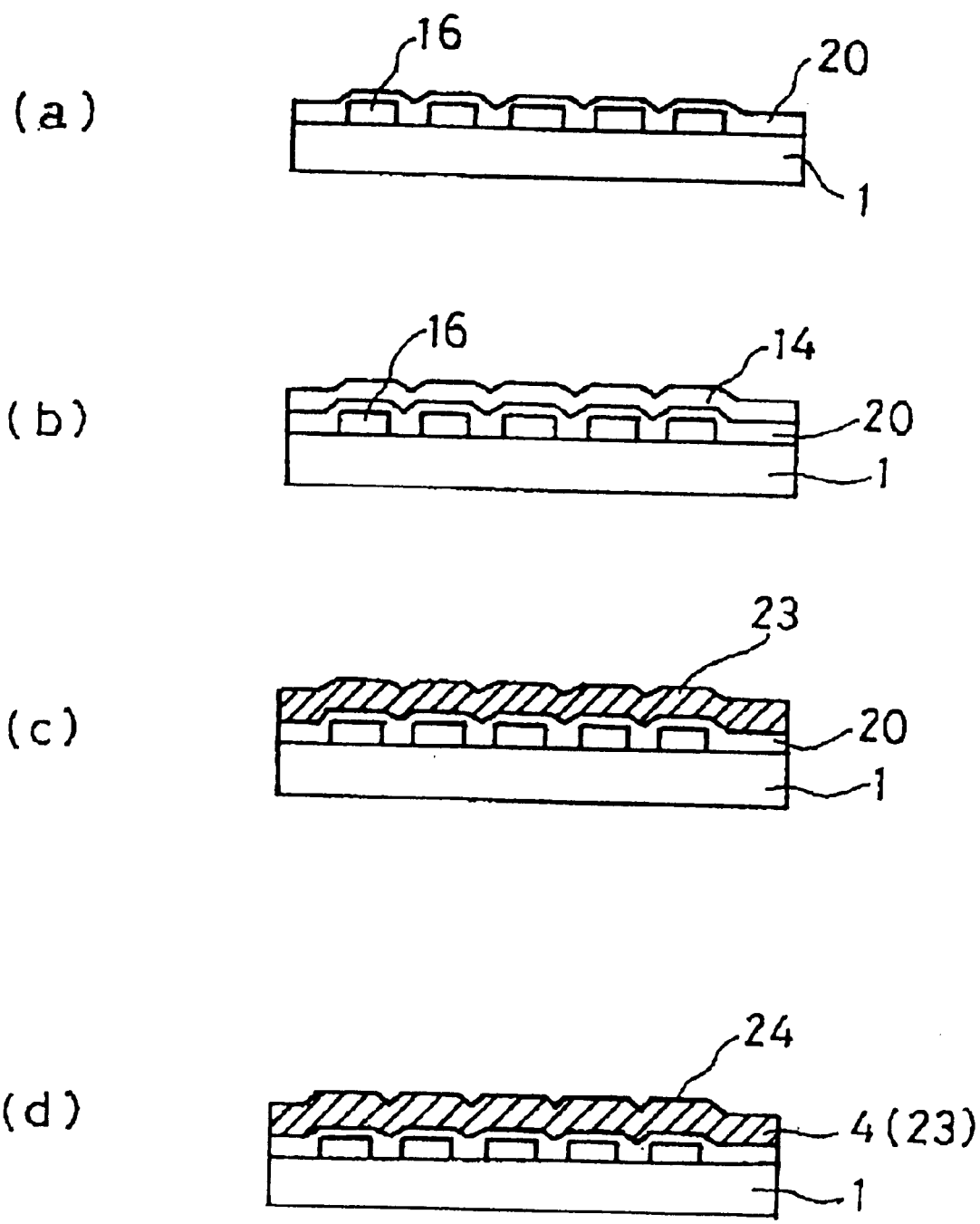
FIGS. 7(a)–(d) an explanatory view that shows the first form of embodiment of the present invention successively in a series of steps (a) to (d), taken along the line IV—IV in FIG. 2.

FIGS. 5 to 7 of the drawings attached hereto show a form of embodiment in which the present invention is applied to the method of preparing a color filter assembly by using an electroplating or electro-depositing technique.

FIG. 5 is a top plan view that illustrates a color filter prepared according to the electroplating or electro-depositing technique. In this Figure, color filter elements 3R, 3G and 3B are arranged in a cellular form to stand in lines, color by color, with each thereof being surrounded by elements of a black matrix 4. And, This form of embodiment of the invention is designed to provide a black matrix 4 which is clearer in picture quality than the conventional black matrix 4.

FIG. 6 is a set of cross sectional views taken along the line III—III in FIG. 5 whereas FIG. 7 is a set of cross sectional views taken along IV—IV in FIG. 5.

An explanation will first be given with respect to FIG. 6. First of all, a glass substrate 1 will be formed, as shown at (a), with a discontinuous ITO thin film 16 in the form of a stripe for the purpose of electroplating. Next, as shown at (b), the said glass substrate 1 and the said ITO thin film 16 will be formed thereon, by a sputtering or the like technique, with a film of zinc oxide 20 until its thickness is grown to 2000 to 3000 angstroms. Further, as shown in at (c), areas other than pixel portions 21 of a color filter 3 will be masked with a discontinuous photo resist 14 and the said oxide film 20 in areas at the said pixel portions 21 will be removed by etching. Then, as shown at (d), the said ITO thin film 16 at those pixel portions 21 and the said film of zinc oxide 20 in the areas other than those portions 21 are made substantially equal to each other in thickness.

Next, as shown at (e) in FIG. 6, the said discontinuous ITO thin film 16 will be formed thereon, by electroplating, with a color matrix 17 which comprises red color filter elements 3R, green color filter elements 3G and blue color filter elements 3B. And, after the said color matrix 17 has been formed, the glass plate 1 will be immersed in a palladium chloride ($PdCl_2$) solution to allow Pd ions to be adsorbed onto the said film of zinc oxide 20 and will then be subjected to an electroless copper plating process to form a black matrix 4 which consists of copper deposits 23 electrolessly plated, as shown at (f) in FIG. 6. In this instance, with said color matrix 17 playing a role as a mask as in the form of embodiment described earlier in connection with FIG. 4, any copper component will never be electrolessly deposited on the said color matrix 17. Thus, the said copper deposits 23 on the said film of zinc oxide 20 will have a thickness that is substantially equal to the thickness of the said color matrix 17.

By the way, since the above mentioned black matrix 4 has a copper surface having a metallic brightness, it is desirable that in order to reduce the reflectivity for a back light the same should be immersed in, for example, water of hydrogen peroxide or nitric acid to convert the surfaces of the said copper deposits 23 into a discontinuous film of copper oxide 24, as shown at (g) in FIG. 6.

Next, referring to FIG. 7, which is a set of cross sectional views taken alone the line IV—IV in FIG. 5 previously described, the section shown represents a cross arrangement of a portion in which a said discontinuous ITO thin film 16 for the purpose of electroplating is disposed in the form of a stripe and a series of spacings where the said ITO film 16 are removed. Accordingly, in order to form a black matrix 4 there in a transverse direction in the Figure, as shown at (a) a said film of zinc oxide 20 as formed on a said glass plate 1 and the said discontinuous ITO thin film 16 as in FIG. 6(*b*) previously described will be masked with a said photo resist 14 as shown at (b) in FIG. 7 so that it may not be etched when a said film of zinc oxide 20 at the pixel portions 21 in FIG. 6(*c*) is removed. Then, the said photo resist 14 will be removed after the said film of zinc oxide 20 at the said pixel portions has been etched. Thereafter, as in the step of FIG. 6(*f*), said copper deposits 23 will be electrolessly formed on the said film of zinc oxide 20 and this will be followed by the oxidation of the said copper deposit 23 on the surface of the black matrix 4, thus forming a said thin film of copper oxide 24 having a low reflectivity for a back light.

According to the above mentioned second form of embodiment of the present invention, it follows that a said black matrix 4 can be formed simply and expensively, without requiring the photo step.

Also, in the electroplating method, it can also be seen that a said film of zinc oxide 20 that is used as rendered electrically conductive by being doped with aluminum is capable of playing two roles as the said ITO thin film for the purpose of electroplating and as the base in the formation of the said black matrix 4.

Figure 8:
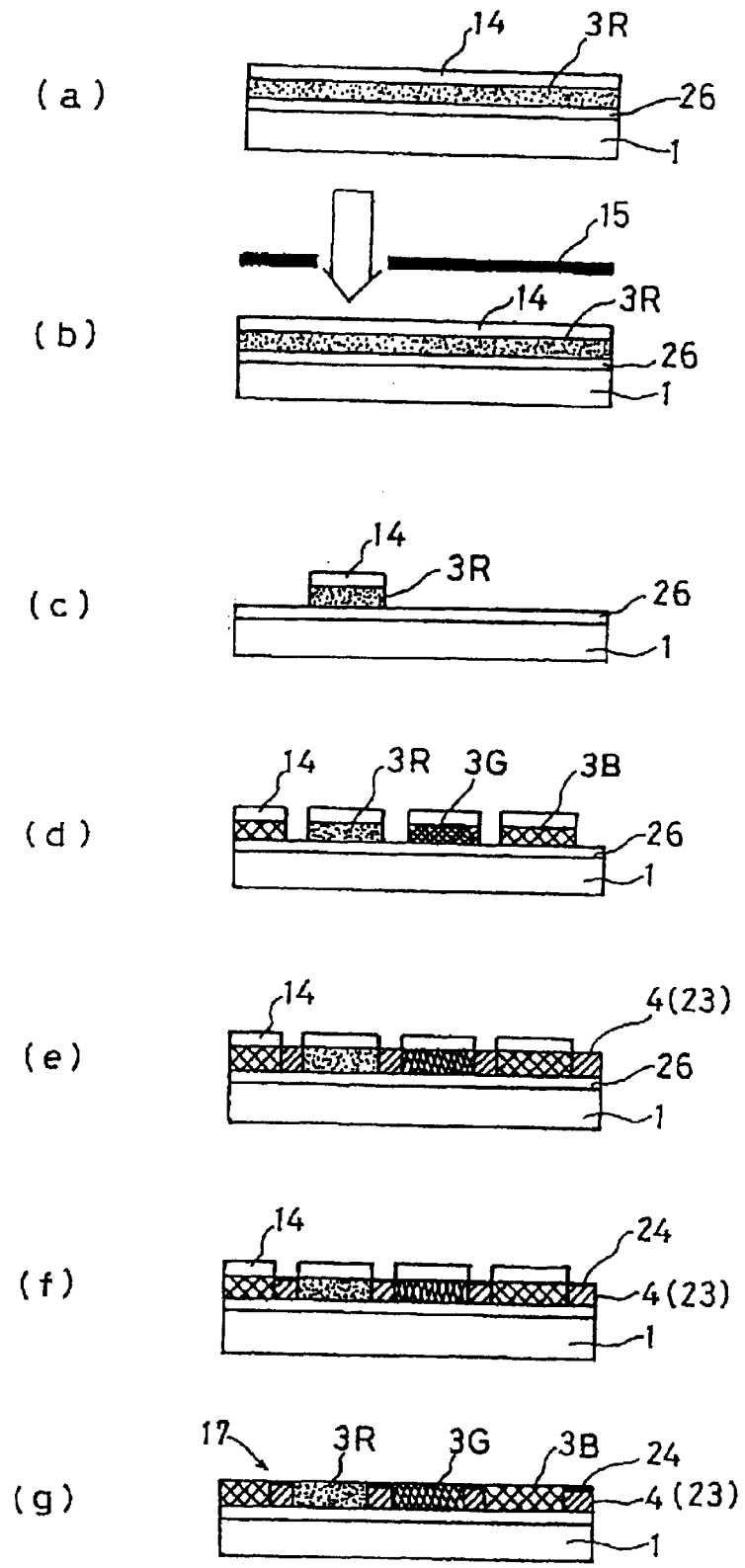
FIGS. 8(a)–(g) are an explanatory view that shows a third form of embodiment of the present invention successively in steps (a) to (g)

FIG. 8 shows a third form of embodiment of the present invention. In contrast to the previously mentioned second embodiment in which the stripe of a said ITO thin film for electroplating is used in electroplating a said color filter, it employs a patternless method using the overall surface of a said ITO thin film, without photo-etching the same. Further, an explanation will be given of an example using a film of zinc oxide that is doped with aluminum, as prepared by using a target of zinc oxide which contains 2% by weight $Al_2O_3$, instead of a said ITO thin film. As compared with a film of zinc oxide that is not doped with aluminum, a film of zinc oxide that is doped with aluminum can provide materials ranging from an electrical insulator to an electrical conductor having an electrical resistivity not greater than $3 \times 10^{-4}$ Ω·cm.

First of all, as shown at (a) in FIG. 8 a said glass substrate 1 will be formed with an aluminum doped zinc oxide film 26 (that is a film of zinc oxide doped with aluminum by sputtering) until its thickness is grown to 2000 to 3000 angstroms. Over the entire surface of the said aluminum doped zinc oxide film 26, there will be electrolytically plated a red color filter element 3R layer over which a said photo resist 14 is coated.

Next, as shown at (b) in FIG. 8, the said layer will be pattern exposed to a light via the said photo resist 14 to provide a said red color filter element 3R, and the color filter element 3R material that is electroplated on the said aluminum doped zinc oxide film 26 at those portions which are other than such color filter 3R elements will be removed by development, as shown at (c). It should be noted at this point that those photo resists 14 on the color filter elements 3R will be left intact. Then, each set of green color filter elements 3G and blue color filter elements 3B will be formed similarly with a series of the procedures (a) to (c) that is repetitively performed.

After the three color filter elements 3R, 3G and 3G have been formed on the said aluminum doped zinc oxide film 26 in this fashion, the said glass substrate 1 which has been formed with the color filter 3 will be immersed in a palladium chloride ($PdCl_2$) solution to allow Pd ions to be adsorbed onto the said aluminum doped zinc oxide film 26. Thereafter, the said glass substrate 1 will be immersed in an electroless copper plating solution to apply copper deposits 23 onto those portions at which the said color filter 3 was not electroplated and the said aluminum doped zinc oxide film 26 is exposed, thereby forming a black matrix 4 as shown at (e) in FIG. 8. The thickness of the said black matrix 4 will then be made substantially equal to the thickness of the said color filter elements 3R, 3G and 3B.

Subsequently, the said glass substrate 1 will be immersed in water of hydrogen peroxide or a solution of nitric acid to lightly oxidize the surfaces of the said copper deposits 23, thereby forming a black colored thin film of copper oxide 24, as shown at (f) in FIG. 8. Finally, as shown at (g), the photo resist 14 on each of the color filter elements 3 will be removed, thus completing a color matrix 17 defined by the said black matrix 4.

According to the present form of embodiment of the invention, although there is a demerit of increasing the photo steps as compared with the previously mentioned second form of embodiment of the invention, it will be seen that a complete, flat color matrix can be formed without requiring an ITO thin film 16 for electroplating, which is essential in the said second form of embodiment of the invention.

It should be noted here that the present invention is not limited to the above mentioned form of embodiment thereof and they can, as needed, be modified or altered in a variety of ways.

For example, while the substrate is composed of a glass in the above mentioned forms of embodiment, the present invention will allow a transparent organic film such as a polyester film, other than a glass, to be used as the said substrate. A polyester film has been tested in applying the present invention thereto and it has been confirmed to achieve the effects which are similar to those attained with a glass substrate. It may be noted, however, that an organic film is relatively poor in heat resistivity as compared with a glass and, for this reason, a selection thereof should be made to use a material which does not cause an adverse thermal influence on the substrate that is formed with a film of zinc oxide by a sputtering or the like technique.

It should also be noted that the present invention is not limited to the electroless copper plating but may utilize electroless plating of any other metal.

As set forth in the foregoing description, it can be seen that the present invention enables a black matrix to be manufactured simply and inexpensively, yet having a high optical density and a low reflectivity.

Also, by forming a film of zinc oxide on a transparent substrate, forming a color filter on the said film of zinc oxide and thereafter applying a deposit of electroless plating onto those portions of the said film of zinc oxide which are not formed with the said color filter while utilizing a catalytic action by means of palladium chloride so that the said deposit of electroless copper plating may have a thickness which is substantially equal to the thickness of the said color filter, it has been noted that a black matrix with the thickness commensurate with the thickness of the color filter can be simply prepared.

Further, by forming a thin film of copper oxide on the surface of a said deposit of electroless copper plating, it has been noted that a black matrix which is stable and of a low reflectivity if viewed from the side of the said color filter can be provided.

Yet further, by using a said film of zinc oxide that is doped with aluminum and permitting it to serve as a transparent electroplating electrode as well, it has been noted that there can be no need to separately provide an ITO transparent electrode.

Also, since zinc oxide is effective to prevent an alkaline substance from being dissolved, it will become possible to use the glass substrate that may be composed of a soda glass.

Further, by using an organic film such as a polyester film as the transparent substrate, it has been noted that a black matrix can be formed that corresponds to a color film liquid crystal display device.

Still also, by connecting a driver IC via its soldered bump to the said copper component in a method of preparing a black matrix for an STN liquid crystal display device, it has been noted that the said driver IC can be directly bonded to the glass substrate.

Figure 9:
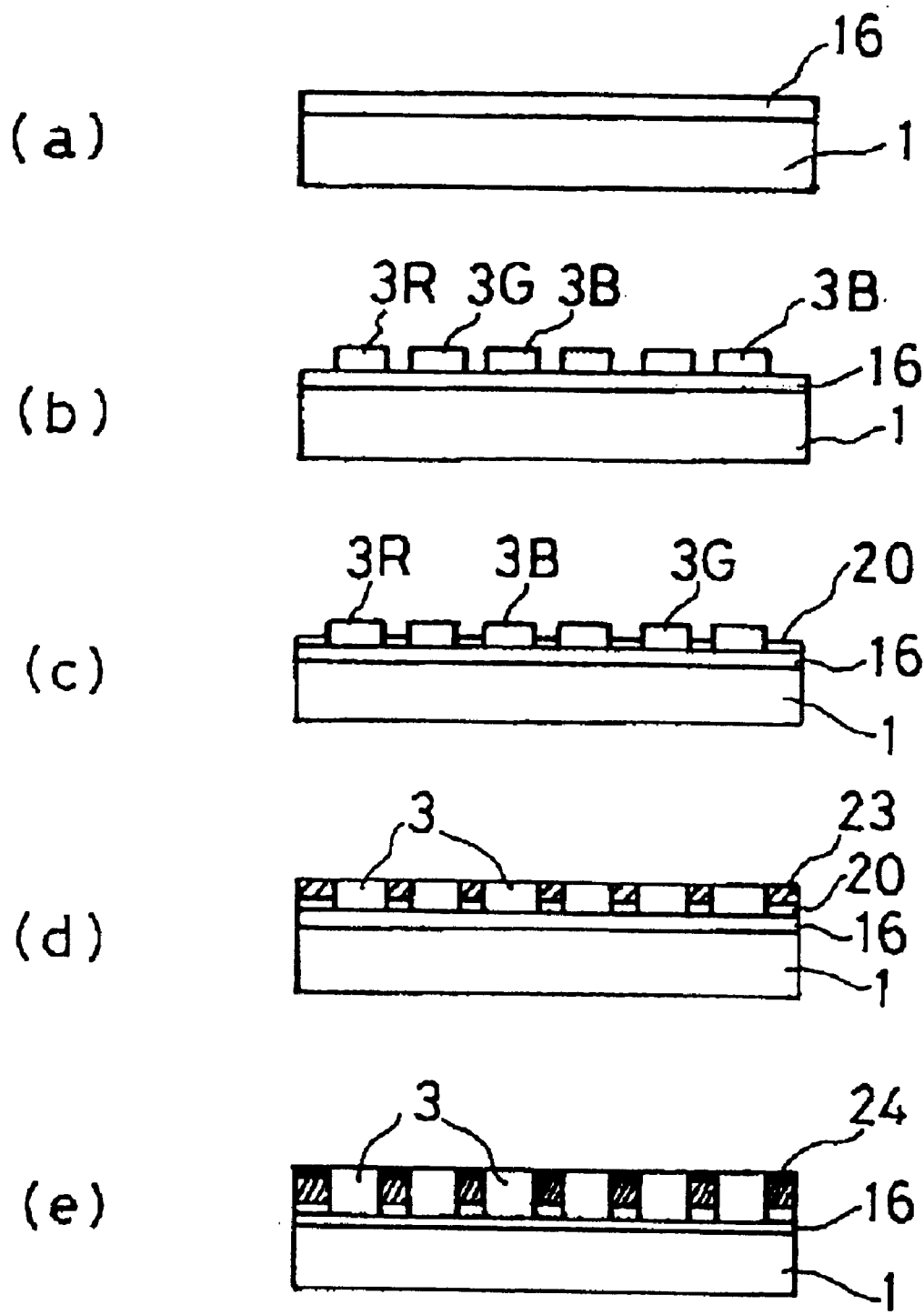
FIGS. 9(a)–(e) are a series of step views that shows a certain form of embodiment of the present invention with respect to a method of preparing a color filter and a black matrix.

FIG. 9 shows another form of embodiment of the method according to the present invention, in which a color filter is formed by a dyeing method, a pigment dispersion method, a film transfer printing method or the like and thereafter a black matrix is formed.

First of all, as shown at (a) in FIG. 9, a glass substrate 1 will be formed, by a sputtering or the like film forming technique, with a transparent ITO (indium tin oxide) electrode film 16 until its thickness is grown to 500 to 1000 angstroms. Thereafter, as shown at (b), a color filter 3 of red, green and blue color filter elements 3R, 3G and 3B will be formed on the said ITO transparent electrode film 16 by using any one of color filter preparation methods mentioned earlier. The said color filter will have a film thickness in a range from 1 to 2 angstroms.

Then, in the step (c) in FIG. 9, a film of zinc oxide (ZnO) 20 will be formed, using a solution electrolysis method, on those surface portions of the ITO transparent electrode 16 which have not been formed with the H, G and B color filter elements 3R, 3G and 3B and which represent a black matrix forming region. The zinc oxide component that constitutes the said film 20 can be cathodically deposited in an aqueous solution of zinc nitrate having a pH of 5.2 with a zinc anode to which a voltage of −0.7 to −1.0 volt is applied.

The above mentioned transparent electrode 16 functions to serves as a power supply electrode also for the purpose of cathodically depositing the said zinc oxide component. The time period that is required to cathodically deposit the said film of zinc oxide 20 of a thickness of 0.15 to 0.3 micron has been found to be 2 to 3 minutes.

Thereafter, in the step (d) in FIG. 9, the said glass substrate 1 that has been formed with the said color filter 3 will be immersed in solution of palladium chloride ($PdCl_2$) having a catalytic action for a period of 1 to 2 minutes to allow Pd ions to be adsorbed onto the said transparent electrode 16, whereupon it will be immersed in an electroless copper plating solution to electrolessly form a copper deposit 23 on the said film of zinc oxide 20 until the said copper deposit has a thickness that is commensurate with the thickness of the said color filter 3. It should be noted at this point that the above mentioned solution of palladium chloride may have, for example, a composition having 0.2 g of Pd $Cl_2$, 0.5 ml of HCl and 500 ml of $H_2O$.

And, while the said electroless plating solution is being carried out, the said copper deposit 23 will be selectively applied onto those surface portions of the film of zinc oxide 20 where it is exposed, and may not be formed on such surface portions thereof as are formed with the said color filter 3. This is because the said color filter 3 plays a role as a mask. It follows, therefore, that a black matrix 4 can be formed in a self-alignment without using a photo step at all.

The said copper deposit 23 of the black matrix 4 will as seen from the side of the said glass substrate 1 located backwards, be viewed in a black color because of the appearance of a surface plasmon polarion (SPP) which is to be described later, but will, as seen from the side at which the said color filter 3 has been formed, be viewed in a color of copper itself having a metallic brightness. Thus, in this state, it has a high reflectivity to a back light and must be said to be poor in its utility.

For this reason, as shown at (e) in FIG. 9, the said glass substrate 1 will as a whole be immersed in a solution that is capable of oxidizing a copper component, e.g., water of hydrogen peroxide or a solution of nitric acid, in order to convert the surface of the said copper deposit 23 into a thin film 24 of copper oxide (CuO) having a low reflectivity. It should be noted, however, that instead of using this wet type of oxidation, a heat treatment in an oxygen atmosphere may be employed as well to convert the surface of the copper deposit 23 into a said thin film of copper oxide 24.

It may be noted at this point that in a metal and a semiconductor that is high in free electron concentration there is a plasmon that is constituted by a compressional wave of free electrons. Since the plasmon is represented by a collective vibration of free electrons, it may of necessity be classified into a polariton that involves the vibration of an electromagnetic field (and that results from a combination of the vibration of particles and the vibration of an electromagnetic field). And, it is known that since a metal or a semiconductor has on its surface a vibrational mode called "plasma polariton", it may be able to absorb lights whose phase velocities become identical to one another.

In general, lights having different phase velocities are not absorbed by a metal having a smooth surface. However, if a metal has a surface irregularity, a change will occur in the phase velocity of an incident light so that lights may be absorbed thereby. When the interface between the copper deposition component 23 and the zinc oxide film 20 in the above mentioned black matrix 4 was observed by an electron microscope, it was confirmed that a minute irregularity in the order of submicrons had been formed. Accordingly, it can be concluded that the black matrix 4 that is prepared according to the present form of embodiment of the invention will enable the surface plasmon polariton to be excited at the said surface irregularity with lights in the visible range and, as a result, will exhibit a tremendous visible light absorptivity, as represented at the interface between the copper deposition component 23 and the zinc oxide film 20 by its optical density (OD) being 5, thus putting an enhanced aperture rate that is much higher than in the prior art, into reality.

Figure 10:
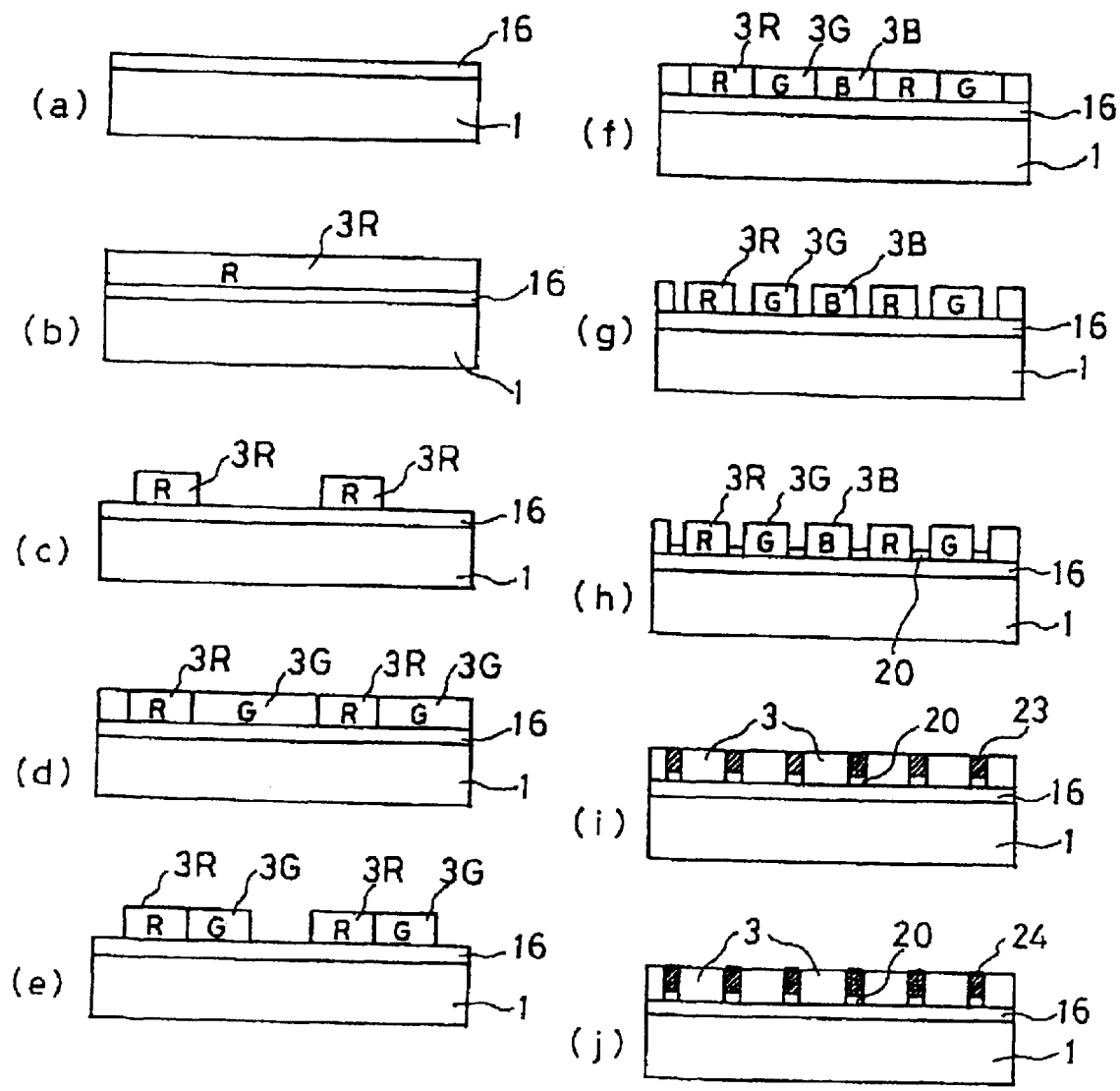
FIGS. 10(a)–(j) are a series of step views that shows another form of embodiment of the present invention with respect to a method of preparing a color filter and a black matrix.

FIG. 10 illustrates a certain form of embodiment of the present invention in which a color filter is prepared by using laser ablation and without using at all a photo resist step that is complicated.

A said glass plate 1 has preliminarily been formed, by a sputtering or the like technique, with a said ITO transparent electrode 16 so that it may have a thickness of around 1000 angstroms. In coating a color filter over the said transparent electrode 16, any one of the pigment dispersion method, the dyeing method, the film transfer method is applicable, but an explanation will here be given with exemplary reference to the electroplating method that that has been known to be the most simple among the others.

In the step (b) shown in FIG. 10, a film for a red (R) color filter element 3R will be electroplated over the entire surface of the said glass substrate 1 with the said ITO transparent electrode 16 serving as an electroplating electrode. Then, the said film for R will be laser ablated by an eximer laser, via a color filter R forming pattern to form R color filter elements 3R as shown at (c) in FIG. 10.

Figure 12:
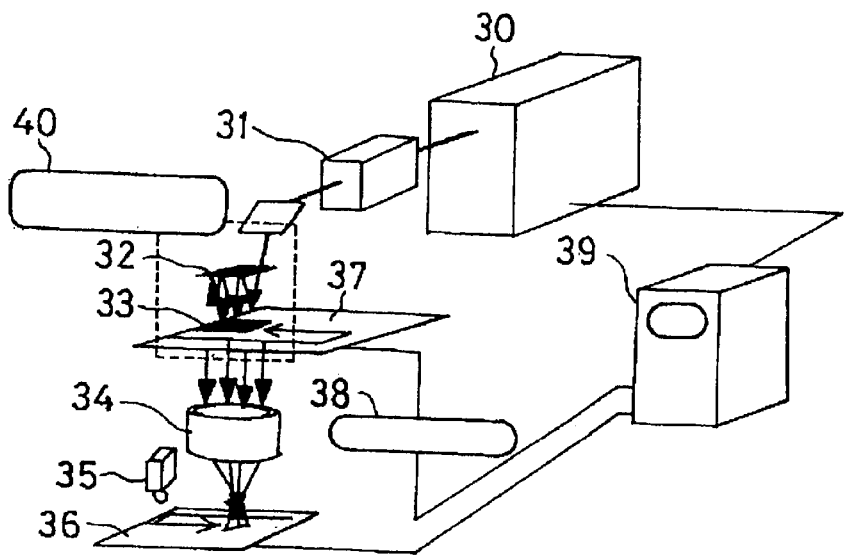
FIG. 12 is a perspective view that shows a specific example of an eximer laser.

An explanation will here be given of the laser ablation with reference to FIGS. 12 and 13.

An eximer laser is an ultraviolet laser and is able to form a pattern by machining a workpiece through laser ablation. Its machining depth is also controllable with a number of laser pulses. Thus, the eximer laser machining is a technology that has been widely employed for machining fine small holes (e.g., via holes and through holes) in a polyimide workpiece that may constitute a flexible printed circuit board, a thin film laminated substrate or the like in recent years.

Referring to FIG. 12, a laser light that is emitted from an eximer laser oscillator 30 is passed through a laser shaping system 31, and its utility efficiency is enhanced through a multi-reflection optical system 40 that comprises a high reflectivity mask 33 and a high reflectivity mirror 32. Then, with a pattern gained through a high reflectivity mask 37 and passing through a focusing optical system 34, the laser light is controlled to illuminate a workpiece 36 and while it is being viewed with a monitor 35 is used to ablade the workpiece 36. In order to enhance the rate of ablation machining, the said mask 37 and the said workpiece 36 are scanned by a scanning system 38 under the control of a CNC controller 39 to carry out a desired ablation machining operation over an entire surface of the workpiece 36.

FIG. 13 illustrates details of an ablation machining operation while a said mask 37 and a said workpiece 36 are being scanned.

First of all, as shown at (a) in FIG. 13, the said mask 37 and the said workpiece 36 will be placed each as movable so that a laser light passed through a pattern a of the mask 37 may be focused through a said focusing optical system 34 to illuminate the workpiece 36, imparting thereto an ablation machined pattern a'. Then, as shown at (b), (c) and (d) in succession, the said mask 37 and the said workpiece 36 will each be intermittently displaced so that when they are stopped, the laser light passed through b, c d and e of the mask 37 may be focused to illuminate the workpiece 35, thereby imparting thereto ablation machined patterns a', b', c' and d'.

Thereafter, referring back to FIG. 10, as shown at (d), a film for a green G color filter element 3G will be electroplated over the entire pixel section except the red R color filter elements 3G by the electroplating method.

Subsequently, the eximer laser will be applied via a said imaging mask 37 for forming a said color filter element 3G to machine through laser ablation blue B color filter 3B forming regions.

As shown at (e) in FIG. 10, a film for a blue B color filter element 3B will be electroplated onto those regions of the said transparent electrode 16 which are exposed, by the electroplating method. It will be apparent that the said glass substrate 1 in this stage has thereon the three color filter elements 3R, 3G and 3B arranged with no interstice whatsoever therebetween, as shown at (f). Then, as shown at (g), using the black matrix forming mask 35 the black matrix forming regions will be machined through laser ablation. Then, as shown at (h), the color filter 3 will be removed by laser ablation so that a said film of zinc oxide 20 may be formed by the solution electrolysis method on those surface portions of the transparent electrode 16 which are exposed. Further, as shown at (i), a said copper deposit 23 will be applied by the electroless plating method upon the said film of zinc oxide 20. Thereafter, as shown t (j), a said film of copper oxide 24 will be formed on a surface of the said copper deposit 23 by an oxidation treatment.

Figure 11:
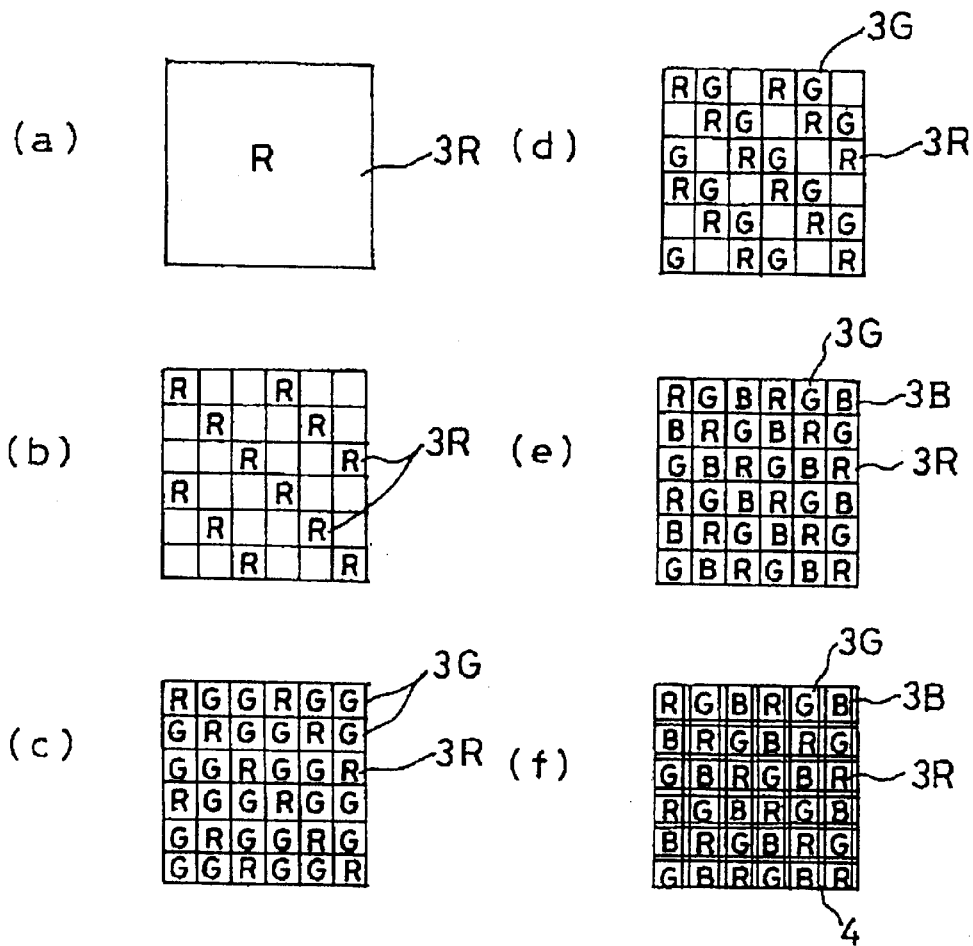
FIGS. 11(a)–(f) are a series of step views that shows the formation of a complicated array of a color filter in the said form of embodiment of the invention in FIG. 11.

In FIG. 11, there is shown a feature of the laser ablation method in which the color filter elements 3R, 3G and 3B if to be arranged in a triangular or a mosaic pattern can be simply formed by only changing the imaging mask, this being shown in its steps with exemplary reference to a said mosaic pattern.

More specifically, as shown at (a) in FIG. 11, a film for a red R color filter element will be electroplated on the said transparent electrode 16. Then, as shown at (b), the said film will be removed except for those regions in which the color red R filter elements 3R are to be formed as are originally intended. Further, as shown at (c), a film for a green G color filter element 3G will be electroplated over the entire area of the transparent electrode 16 from which the film for a said red R color element has been removed. Then, as shown (d), those portions of the film for a said green G color element which are to be formed with blue B color filter elements 3B will be removed by the eximer laser. Then, as shown at (e), a film for a said blue color filter element 3B will be electroplated. Further, as shown at (f), those portion of this film which represent black matrix forming regions will be removed by the eximer laser.

In this manner, it will be seen that by employing an eximer laser an extremely fine arrangement of color filter elements 3R, 3G and 3B can be formed.

Figure 15:
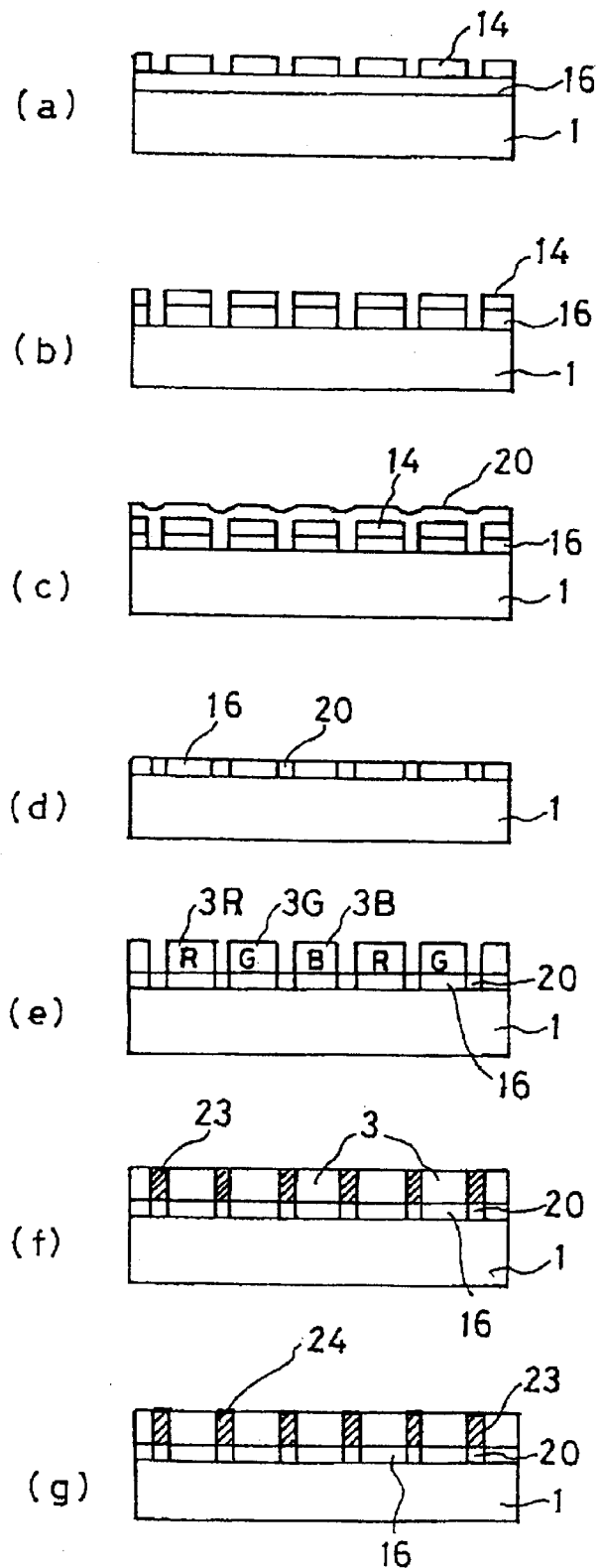
FIGS. 15(a)–(g) are a series of step views in cross section taken along the line A–A' in FIG. 14.
Figure 16:
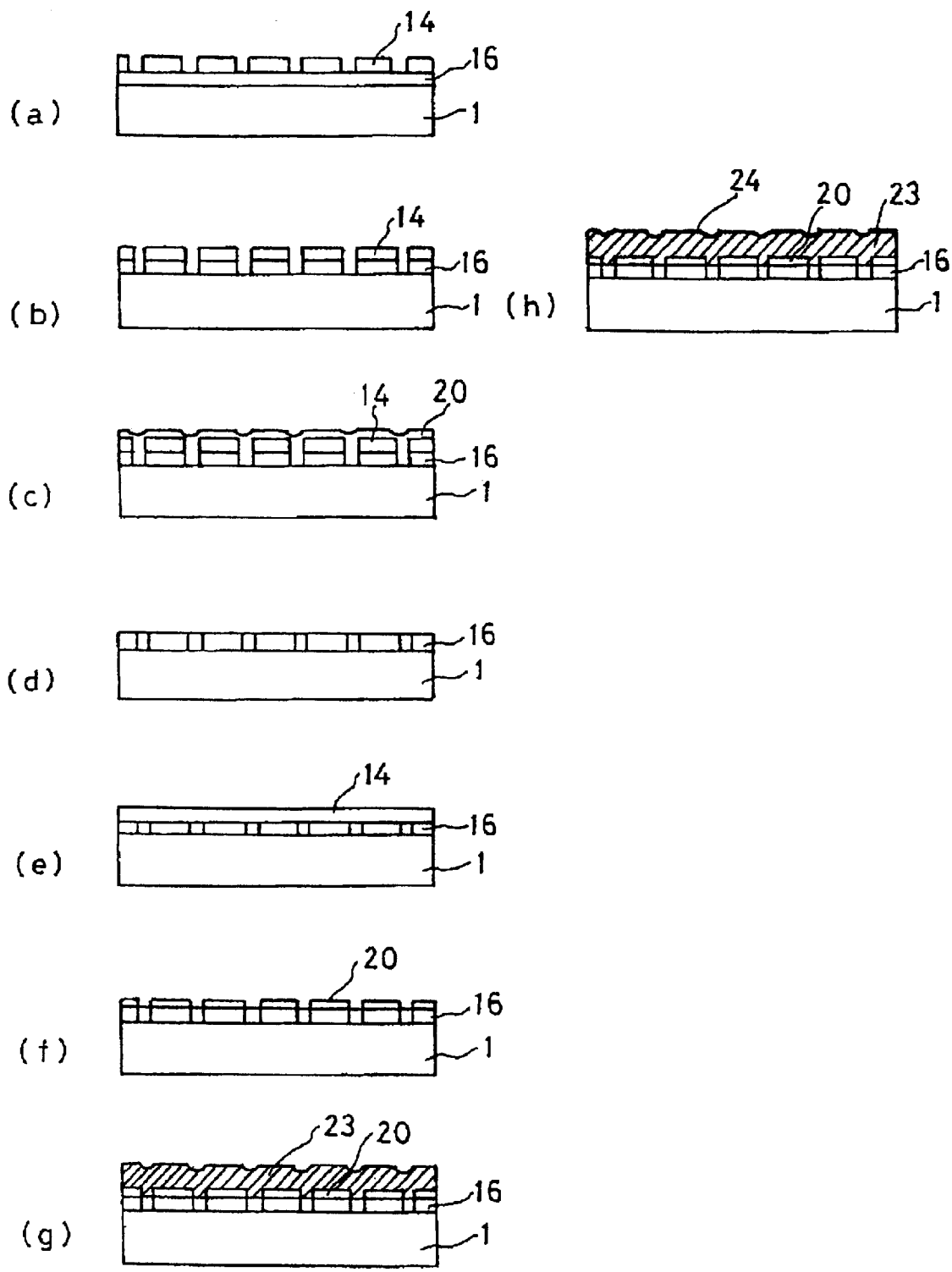
FIGS. 16(a)–(h) are a series of step views in cross section taken along the line B–B' in FIG. 14.

FIGS. 14 to 16 illustrate certain forms of embodiment of the present invention which are limited to the use of an electroplating method. In an electroplating method, it should be noted that it has hither been difficult to form any relevant thing other than a black matrix. Now, an explanation will be given of a method of manufacturing for providing a desired formation by taking the advantage in the electroplating method for a black matrix.

FIG. 14 is a top plan view that illustrates a color filter as prepared in the electroplating method, FIG. 15 is a series of step views in cross section taken along the line A—A in FIG. 14, and FIG. 16 is a series of step views in cross section taken along the line B—B in FIG. 14.

As shown at (a) to (c) in FIG. 15, a said glass plate 1 will be formed, by a sputtering or the like technique, with a said ITO transparent electrode 16 until its thickness is grown to around 0.1 micron, and a transparent electrode strip 16' for the purpose of electroplating a color filter film will be formed by means of a series of photo resists 14. In the state in which the said photo resists 14 for forming the said transparent electrode strip 16' are left intact, the said glass substrate 1 will be immersed in an aqueous solution of a temperature of 50° C. and containing zinc nitrate and dimethylaminoborane (DMAB) for a period of about 20 minutes to form an insulating film of zinc oxide 20 with a film thickness of 0.2 micron. Then, the said photo resists 14 will be removed to form a said transparent electrode 16 and a said film of zinc oxide 20 in a state in which they are cross arranged, as shown at (d).

Thereafter, as shown at (e) in FIG. 15, the said color filter elements 3R, the said color filter elements 3G and the said color filter elements 3B will be electroplated in succession. After these color filter elements 3R, 3G and 3B have been formed, an electroless plating process will be carried out to form a said copper deposit 23 ay each of those portion in which a said film of zinc oxide 20 has been formed, as shown at (f). Finally, as shown at (g), a surface of the said copper deposit 23 will be oxidized to form a said film of copper oxide 24, thus completing a black matrix 4.

FIG. 16 is a set of step views in cross section taken along the line B—B in FIG. 14, in which the steps (a) to (d) are identical to (a) to (d) in FIG. 15.

Following the step (d) in FIG. 16, in order to prevent color filter elements 3R, 3G and 3B from being electroplated on those portions of the transparent electrode 16 which have been formed with the said black matrix 4, such portions as corresponding to a transverse stripe will be coated with a photo resist 14, as shown at (e). Then, a process of electroplating will be entered in which, however, any color filter element 3 will be electroplated where there is the said photo resist 14 formed in the said transverse stripe.

After the process of electroplating the said color filter elements 3R, 3G and 3B has been terminated, the said photo resist 14 will be removed as shown at (f) in FIG. 16, and those exposed portions of the transparent electrode 16 which correspond to the said transverse stripe will be electroplated with a film of zinc oxide 20' by a solution electrolysis method. Then, the said color filter substrate 1 will be immersed in an electroless copper plating solution to allow a film of copper 23 to be deposited on the said film of zinc oxide 20' as shown at (g). Finally, as shown at (h), a surface of the said copper film 23 will be oxidized to form a film of copper oxide 24, thus completing a black matrix 4.

An explanation will here be given briefly of the method of forming a transparent film of zinc oxide from an aqueous solution. In this method, unlike the previously described electroplating method by which a film of zinc oxide is formed, makes it unnecessary to provide a power supply electrode terminal. What plays an important role there is a reduction reaction of nitride ions which forms zinc oxide from the aqueous solution. Reactions equations there involved are set forth below.

$$ZnO(NO_3)_2 \rightarrow Zn^{2+} + 2NO_3^- \tag{1}$$

$$(CH_3)_2 + H_2O \rightarrow BO_2^- + (CH_3)_2NH + 7H^+ + 6e^- \tag{2}$$

$$NO_3^- + H_2O + 2e^- \rightarrow NO_2^- + 2OH^- \tag{3}$$

$$Zn^{2+} + 2OH^- \rightarrow Zn(OH)_2 \tag{4}$$

$$Zn(OH)_2 \rightarrow ZnO + H_2O \tag{5}$$

After washing, the glass substrate will be immersed in a sensitizer liquid containing 1 g/dm$^{-3}$ of SnCl$_2$. 2H$_2$O and 1.0 ml/dm$^{-3}$ of 37% HCl for several minutes and then will be immersed in an active β liquid containing 0.1 g/dm$^{-3}$ of PdCl$_2$ and 0.1 ml/dm$^{-3}$ of 37% HCl. After having been subjected to the above mentioned preliminary treatment, the said glass substrate 1 will be immersed in the aqueous solution that is heated to about 50° C. and that contains 0.05 mol/l of zinc nitrate and 0.001 to 0.15 mol/l of dimethylboran (DMAB). Then, after a lapse of time of about 20 minutes, a film of zinc oxide 20 of a thickness of 0.2 micron will be formed on the said glass substrate 1.

Unlike a film of zinc oxide that is formed according to a sputtering or electroplating method, a film 20 that is formed according to the above mentioned method is characterized in that it is high in its insulation properties. This fact constitutes a favorable feature since a high resistivity is required for a zinc oxide material that is used as the base of a black matrix where a color filter is formed by an electroplating method, although a high resistance zinc oxide film 20 that is used as the said transparent electrode is a problem.

Figure 17:
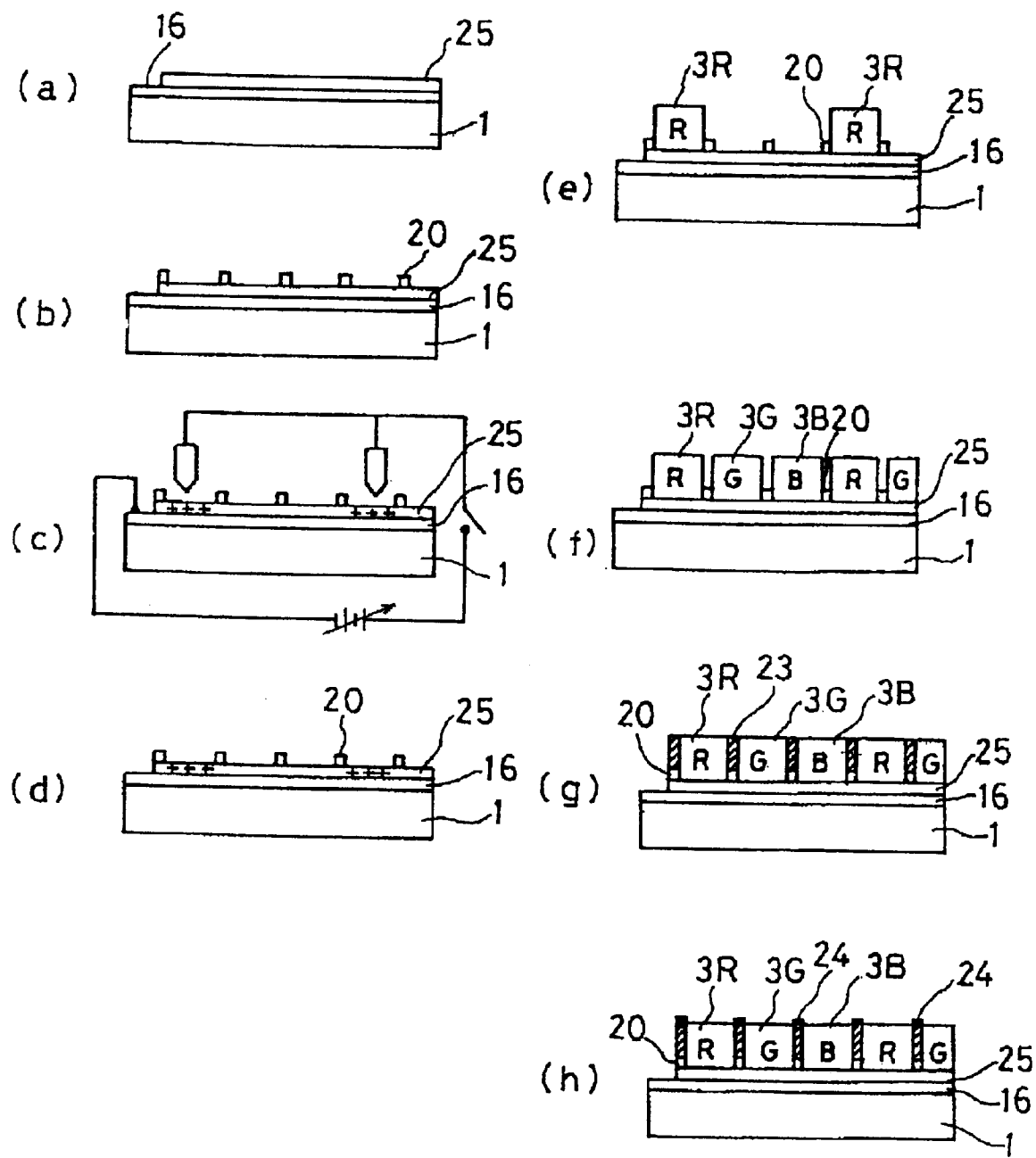
FIGS. 17(a)–(h) are a series of step views that shows another form embodiment of the present invention with respect to a method of preparing a color filter and a black matrix.

An explanation will next be given of a method of forming a color filter and a black matrix without requiring a photo resist at all, with reference to FIG. 17.

As shown at (a), a said glass matrix 1 will be formed over its entire surface with a said ITO transparent electrode 16 by a sputtering or the like technique until its thickness is grown to 500 to 1000 angstroms. In order to polarize and charge the said transparent electrode 16, there will be formed thereon a transparent film 25 of a ferroelectric substance (such as PZT) of a thickness of 0.1 micron. Then, the said film of the ferroelectric substance 25 will be coated over its entire a zinc oxide material having a photosensitivity by a spin coating or roll coating method and then will be preliminarily baked. Subsequently, by using a black matrix forming mask for a color filter, it will be exposed to a light and developed, whereafter as shown at (b), a film of zinc oxide 20 mentioned above will be left only in those regions thereof where a black matrix will be formed. Then, by performing a main baking procedure, a fine film of zinc oxide 20 will be formed. With the said film of zinc oxide 20 being a film of non-ferroelectric substance, it can be seen that a DC field is applied across it in an attempt to polarize the same, there will be left thereon no residual polarization. Then, as shown at (c), a DC filed will be applied between the said transparent electrode 16 poled negative on the said glass substrate 1 and the positively poled regions where red R color filter elements 3R are to be formed, to produce a residual plus polarization on the surface of the said film of the ferroelectric substance 25, as shown at (d). The polarization to this end may be carried out either by polarizing the entire surface of the color filter at a one time with a two-dimensional stylus or successively polarizing the same with a one-dimensional stylus.

Next, the said glass substrate 1 on which the said color filter elements 3R have been polarized will be immersed in a micell electrolyte in which particles of an organic pigment for a red color filter element 3R are dispersed. The said particles of the organic pigment of the color filter elements 3R will be charged negative by the presence of a micellized substance so that, as shown at (e), the said color filter elements 3R may be deposited onto the said film of the ferroelectric substance 25 whose surface is polarized positive. Similarly, the color filter elements 3G and the color filter elements 3B will be deposited onto the said glass substrate 1. In the step (f) shown in FIG. 17, the said glass substrate 1 on which the said color filter elements 3R, 3G and 3B have been formed will be immersed in an electroless copper plating liquid to apply a copper deposit 23 on each of the portions which are to constitute a black matrix, as shown at (g). Finally, as shown at (h), the surface of the said copper deposit or film 23 will be oxidized to form a film of copper oxide 244 thereon.

Figure 18:
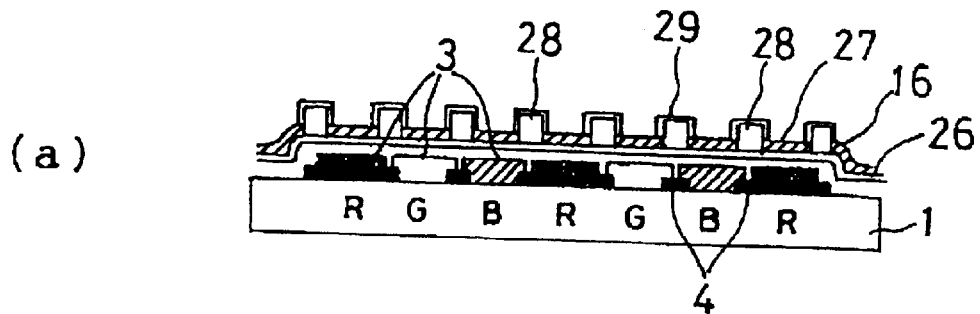
FIGS. 18(a)–(c) are a series of step views that diagrammatically shows a certain form of embodiment of the formation of a liquid crystal display device utilizing a method of preparing a cell gap controlling spacer arrangement according to the present invention.
Figure 18:
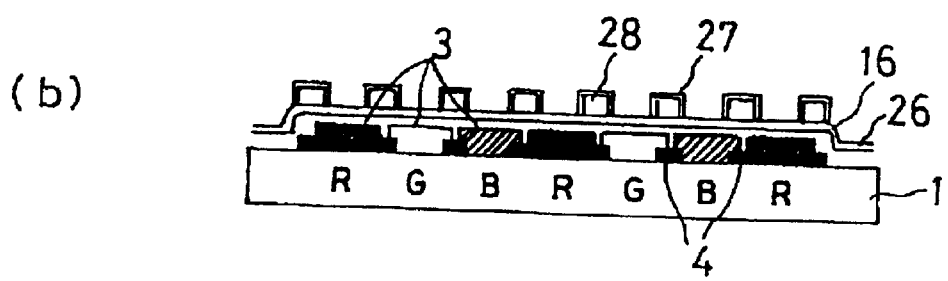
Figure 18:
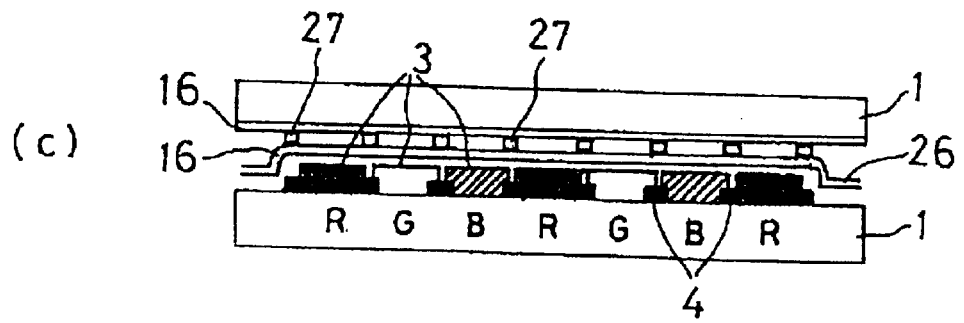

FIG. 18 illustrates a certain form of embodiment of the method of preparing a cell gap controlling spacer arrangement according to the present invention.

As shown at (a) in FIG. 18, it is seen that a black matrix 4 and a color filter 3 have been formed on a said glass substrate 1, by using any of the methods mentioned earlier In addition, the color filter elements 3 are covered with a protective film 26.

In such a state, an ITO thin film 16 constituting the transparent electrode will be formed on the above mentioned protective film 26 by a sputtering or evaporation method, and a photo resist pattern 27 for the purpose of forming spacers will be formed on the said ITO thin film 16 by using a spacer forming mask. Then, a plurality of square columnar spacers 28, 28, . . . for controlling cell gaps, each of which consists of a transparent zinc oxide component, will be formed as spaced apart from one another with a predetermined spacing, by a solution electrolysis method, lying at portions not covered by the said photo resist pattern 27 and being connected to the said ITO thin film 16. It can be seen that the top of each of the said spacers 28 is projected upwards of the said photo resist pattern 27. Then, by using an immersion method, the surface of each of the said spacers 28 will be coated with a highly insulating film of zinc oxide 29.

Then, as shown at (b) in FIG. 18, a cell gap controlling spacer arrangement 28 will result by removing the said photo resist pattern 27. It should be noted at this point that each of the said spacers 28 may be cylindrical.

And, a liquid crystal display device can be manufactured as shown at (c) in FIG. 18 by attaching a unit with the said substrate 1 as assembled as above to another substrate 1 with an ITO thin film 16 and so forth with the use of the said cell gap controlling spacers 28 and sealing a liquid crystal in the construction so attached.

According to the present form of embodiment of the invention, it will thus be seen that an arrangement of spacers which are accurately positioned in a photo step without a spacer spreading unit can be prepared to enable a liquid crystal display device to be created with a predetermined thickness.

While the present invention has hereinbefore been described with respect to a certain illustrative embodiment thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A method of manufacturing a color display including a color filter and a black matrix, characterized in that said black matrix is prepared by the steps of:

forming a film of zinc oxide on a transparent substrate; and applying a deposit of electroless copper plating onto said film of zinc oxide while utilizing a catalytic action by palladium chloride, said deposit constituting an element of said black matrix.

2. A method as set forth in claim 1, characterized in that a thin film of copper oxide is formed on a surface of said deposit of electroless plating.

3. A method as set forth in claim 1, characterized in that said transparent substrate is a glass substrate.

4. A method as set forth in claim 3, characterized in that said glass substrate is made up of a soda glass.

5. A method as set forth in claim 1, characterized in that said transparent substrate is made up of an organic film.

6. A method as set forth in claim 5, characterized in that said organic film is a polyester film.

7. A method as set forth in claim 1, characterized in that a driver integrated circuit is connected through a solder bump to said electrolessly plated copper deposit.

8. A method of manufacturing a color display including a color filter and a black matrix, characterized in that said black matrix is prepared by the steps of:

forming a film of zinc oxide on a transparent substrate; and applying a deposit of electroless copper plating onto said film of zinc oxide while utilizing a catalytic action by palladium chloride, said deposit constituting an element of said black matrix, and said color filter is prepared by the steps of:

doping said film of zinc oxide with aluminum; and electrolytically forming said color filter while using said aluminum doped zinc oxide film as a transparent electrode.

9. A method of manufacturing a color display including a color filter and a black matrix, characterized in that said black matrix is prepared by the steps of:

forming a film of zinc oxide on a transparent substrate;

applying a deposit of electroless copper plating onto said film of zinc oxide while utilizing a catalytic action by palladium chloride, said deposit constituting an element of said black matrix; and forming a thin film of copper oxide on a surface of said deposit of electroless plating, and said color filter is prepared by the steps of:

doping said film of zinc oxide with aluminum; and electrolytically forming said color filter while using said aluminum doped zinc oxide film a transparent electrode.

10. A method of manufacturing a color display including a color filter and a black matrix, characterized in that it comprises the steps of:

forming a film of zinc oxide on a transparent substrate;

forming said color filter on said film of zinc oxide; and thereafter, applying a deposit of electroless copper plating on an area of said film of zinc oxide on which said color filter is not formed, said deposit having a thickness which is substantially equal to a thickness of said color filter and constituting an element of said black matrix.

11. A method as set forth in claim 10, characterized in that a thin film of copper oxide is formed on a surface of said deposit of electroless plating.

12. A method as set forth in claim 10, characterized in that said film of zinc oxide is doped with aluminum and is used as a transparent electrode for forming thereon said color filter electrolytically.

13. A method as set forth in claim 11, characterized in that said film of zinc oxide is doped with aluminum and is used as a transparent electrode for forming thereon said color filter electrolytically.

14. A method as set forth in claim 10, characterized in that said transparent substrate is a glass substrate.

15. A method as set forth in claim 14, characterized in that said glass substrate is made up of a soda glass.

16. A method as set forth in claim 10, characterized in that said transparent substrate is made up of an organic film.

17. A method as set forth in claim 16, characterized in that said organic film is a polyester film.

18. A method as set forth in claim 10, characterized in that a driver integrated circuit is connected through a solder bump to said electrolessly plated copper deposit.

* * * * *